United States Patent [19]

Hayashi et al.

[11] Patent Number: 4,525,499
[45] Date of Patent: Jun. 25, 1985

[54] NON-AQUEOUS DISPERSION TYPE RESIN COMPOSITION

[75] Inventors: Masaaki Hayashi, Tokyo; Hiroharu Sasaki, Yamato, both of Japan

[73] Assignee: Dai Nippon Toryo Co., Ltd., Osaka, Japan

[21] Appl. No.: 611,144

[22] Filed: May 17, 1984

[30] Foreign Application Priority Data

May 26, 1983 [JP] Japan .................................. 58-93277
May 30, 1983 [JP] Japan .................................. 58-95380
Aug. 26, 1983 [JP] Japan ................................ 58-155920

[51] Int. Cl.³ .................. C08L 67/06; C09D 3/64; C09D 3/80; C09D 5/02
[52] U.S. Cl. .................................... 523/523; 524/457; 524/461; 524/504; 524/923; 525/7
[58] Field of Search ............... 523/523; 524/457, 461, 524/504, 923; 525/7

[56] References Cited

U.S. PATENT DOCUMENTS

| | | | |
|---|---|---|---|
| 3,382,297 | 5/1968 | Thompson | 526/201 |
| 3,847,851 | 11/1974 | Tugukuni et al. | 523/202 |
| 3,914,335 | 10/1975 | Tugukuni et al. | 528/45 |
| 4,296,014 | 10/1981 | Hayashi et al. | 523/504 |
| 4,340,511 | 7/1982 | Backhouse et al. | 525/450 |

FOREIGN PATENT DOCUMENTS 1156012  6/1969  United Kingdom ................ 524/923
1206442  9/1970  United Kingdom ................ 524/923

Primary Examiner—Ronald W. Griffin
Attorney, Agent, or Firm—Oblon, Fisher, Spivak, McClelland & Maier

[57] ABSTRACT

A non-aqueous dispersion type resin composition comprising (I) a non-polar or slightly polar aliphatic hydrocarbon solvent as a dispersion medium, and (II) particles stably dispersed in the dispersion medium, wherein each of said particles is composed of:

(A) from 20 to 70% by weight of a disperse particle made of (a) a polyester-modified vinyl copolymer containing a hydroxyl group, (b) a vinyl copolymer containing a hydroxyl group or (c) a vinyl ester-modified vinyl copolymer containing a hydroxyl group, and (B) from 80 to 30% by weight of a vinyl resin dispersion stabilizer surrounding the disperse particle as a protective layer, which has a component compatible with the disperse particle or is chemically bonded thereto and which is solvated by the dispersion medium, said dispersion stabilizer being composed of (i) an N-alkoxymethylated monomer of an $\alpha,\beta$-monoethylenically unsaturated carboxylic acid amide and (ii) an $\alpha,\beta$-monoethylenically unsaturated monomer other than the monomer (i), and said dispersion medium is capable of dissolving the dispersion stabilizer and incapable of dissolving the disperse particles.

13 Claims, No Drawings

NON-AQUEOUS DISPERSION TYPE RESIN COMPOSITION

The present invention relates to a non-aqueous dispersion type resin composition of room temperature drying or thermosetting type.

In recent years, there has been an increasing need for the conservation of resources and the prevention of air-pollution also in the field of paints and coatings.

High solid paints as resource conservation type paints wherein the solid component is highly concentrated while the solvent content in the composition is minimized, are advantageously used for the reason that the conventional processes for the preparation of such paints and coating apparatus may be utilized.

However, usual high solid type paints which require a substantial amount of aromatic or ester solvents, are not necessarily suitable for the industrial purposes particularly in view of the restrictions introduced in recent years on the use of solvents to cope with the air pollution problems.

In view of the recent trend for further restrictions on the use of solvents, and with a view to preventing air-pollution and conserving resources in a broad sense, non-aqueous dispersion type paint compositions have been proposed in which an aliphatic hydrocarbon solvent is used as the main solvent.

As the combination of a dispersion stabilizer/disperse particles in the conventional non-aqueous dispersion type resin compositions, there may be mentioned, for instance, decomposed natural rubber/acrylic resin, acrylic resin/acrylic resin, oil-modified alkyd resin/acrylic resin or polybutadiene/acrylic resin.

Specifically, the following methods and resin compositions are known:

(1) A method for forming a cross-linkable polymer dispersion comprising the first step of copolymerizing an ethylenically unsaturated monomer with another ethylenically unsaturated monomer having a chemically reactive, cross-linking group in the presence of a block or graft copolymer dispersion stabilizer and the second step of adding an ethylenically unsaturated monomer and other ethylenically unsaturated monomer having a complementary, chemically reactive, cross-linking group to the reaction mixture and copolymerizing them in the reaction mixture (see U.S. Pat. No. 3,382,297 and British Pat. No. 1,095,288).

(2) A method for preparing a cross-linkable dispersion having an automatically oxidative component or a component capable of free radical-initiating addition reaction, which comprises forming a dispersion of an insoluble polymer containing at least one chemically reactive group per molecule of the polymer by dispersion polymerization of an α,β-ethylenically unsaturated monomer in the presence of a stabilizer, and reacting the resulting insoluble polymer with an unsaturated component having a complementary, chemically reactive group (Japanese Examined Patent Publication No. 9708/71).

(3) A method for forming a coating composition which comprises copolymerizing an olefinically unsaturated monomer having an alcoholic hydroxyl group with another olefinically unsaturated monomer in the presence of a polymer soluble in an organic liquid, and reacting the resulting copolymer with a polyisocyanate (Japanese Examined Patent Publication No. 25015/71).

(4) A thermosetting synthetic polymer dispersion comprising a mixture of a polymer dispersion (I) comprising a polymer having a chemically reactive group, said polymer being dispersed stably in an organic liquid by a vinyl polymer, oil-modified alkyd resin, oil-modified epoxy resin or oil-modified urethane resin stabilizer solvated in said organic liquid, and a polymer dispersion (II) comprising a polymer having a complementary, chemically reactive group, said polymer being dispersed in the organic liquid by said stabilizer (see U.S. Pat. No. 3,847,851).

(5) A thermosetting composition obtained by polymerizing in an organic liquid (a) a copolymerizable unsaturated monomer having a latent isocyanate group and being capable of releasing a free isocyanate group under heating and/or (b) an α,β-ethylenically unsaturated monomer in the presence of (c) a component solvated in said organic liquid, at least one of said monomer (b) and said component (c) having a latent isocyanate group capable of releasing a free isocyanate group under heating and at least one of said monomers (a) and (b) and component (c) having an active hydrogen atom (see U.S. Pat. No. 3,914,335).

(6) A method of stabilizing a polymer dispersion, comprising incorporating in the polymer dispersion a stabilizer comprising a hydroxyl or carboxyl terminated alkyd molecule having side chains which are ester groups derived from one or more long chain saturated fatty acids, said alkyl molecule being solvated by the continuous phase in which the polymer is dispersed, and a polymeric chain grafted on the alkyd molecule and compatible with the dispersed polymer (see British Pat. No. 1,206,442).

(7) A process of making dispersion in organic liquid of particles of an addition polymer which is crosslinkable without the addition of a cross-linking agent by dispersion polymerization of a mixture of ethylenically unsaturated monomers comprising one monomer containing a reactive group, another monomer containing a complementary reactive group and a major proportion of a monomer or monomers devoid of said reactive groups, the two reactive groups being capable of reacting with each other so that, when incorporated in the copolymer chains, they are capable of cross-linking the copolymer chains but the copolymerization being carried out without significant premature reaction between the two groups by, during the main course of the polymerization, adding the monomers to the organic liquid at such a rate that the concentration of free monomers in the organic liquid is not greater than 10% by weight (see British Pat. No. 1,156,012).

However, the coating films obtainable from the conventional non-aqueous dispersion type compositions do not necessarily provide adequate physical properties. For instance, a flexible coating film tends to have inadequate hardness. Whereas, a hard coating film tends to have inadequate flexibility. Thus, there has been no coating film which adequately satisfies both requirements. In addition, it used to be difficult to fully satisfy additional requirements such as salt spray resistance, moisture resistance and water resistance as well as requirements for secondary physical properties after the respective tests.

In addition, in a non-aqueous dispersion type resin composition wherein the above-mentioned combination is used as the vehicle, the compatibility between the dispersion stabilizer component (i.e. the solvatable component) and the disperse particle component (i.e. the formed polymer) tends to decrease due to the difference in their polarity, and accordingly the coating film obtainable from such a composition tends to have poor transparency, gloss or luster. Accordingly, the non-aqueous dispersion type resin composition wherein the above-mentioned combination is used as the vehicle, used to be regarded as not suitable for exterior coating and has been used primarily for interior coating.

Further, in order to obtain a hardened coating film of better quality, the above-mentioned vehicle is usually used in combination with a hardener such as an aminoformaldehyde resin, a block isocyanate compound, an epoxy resin or a methoxymethylated acrylamide resin, which is reactive with a functional group in the vehicle. These hardeners are usually incorporated at the time of the preparation of paints. It has been frequently observed that during the storage for an extended period, the functional group in the non-aqueous dispersion gradually reacts with a functional group in the hardener and consequently the viscosity of the composition increases, or precipitation takes place due to coagulation or flocculation.

It is an object of the present invention to overcome various difficulties inherent to the prior art and to provide a non-aqueous dispersion type resin composition which is capable of forming a transparent coating film having an excellent finished outer appearance and superior weather resistance or chemical resistance, by incorporating a certain specific functional group as a component of the dispersion stabilizer, which is cross-linkable with the functional group in the disperse particle component.

Namely, present invention provides a non-aqueous dispersion type resin composition comprising (I) a nonpolar or slightly polar aliphatic hydrocarbon solvent as a dispersion medium, and (II) particles stably dispersed in the dispersion medium, wherein each of said particles is composed of:

(A) from 20 to 70% by weight of a disperse particle made of (a) a polyester-modified vinyl copolymer containing a hydroxyl group, (b) a vinyl copolymer containing hydroxyl group or (c) a vinyl ester-modified vinyl copolymer containing a hydroxyl group, and (B) from 80 to 30% by weight of a vinyl resin dispersion stabilizer surrounding the disperse particle as a protective layer, which has a component compatible with the disperse particle or is chemically bonded thereto and which is solvated by the dispersion medium, said dispersion stabilizer being composed of (i) an N-alkoxymethylated monomer of an $\alpha,\beta$-monoethylenically unsaturated carboxylic acid amide and (ii) an $\alpha,\beta$-monoethylenically unsaturated monomer other than the monomer (i), and said dispersion medium is capable of dissolving the dispersion stabilizer and incapable of dissolving the disperse particles.

Now, the present invention will be described in detail with reference to the preferred embodiments.

The solvent to be used in the present invention, i.e. the "aliphatic hydrocarbon solvent", has the following characteristics.

Namely, it is a non-polar or slightly polar solvent which is capable of dissolving the dispersion stabilizer as well as the $\alpha,\beta$-monoethylenic monomers (i), (ii), (iii), (iv), (v) and (vi) as described in detail hereinafter, and which is incapable of dissolving the disperse particles.

Specifially, there may be mentioned an aliphatic hydrocarbon such as hexane, heptane, octane, cyclohexane, cycloheptane, methylcyclohexane, ethylcyclohexane or dimethylcyclohexane, or a mixture comprising a mineral spirit or an aliphatic naphtha as the main component. These solvents may be used alone or in combination as a mixture of at least two difference kinds. Further, such an aliphatic hydrocarbon solvent may be used in combination with e.g. an aromatic solvent as described hereinafter, to such an extent that the stability of the dispersed particles will not be impaired.

Now, the "dispersion stabilizer" of the present invention will be described. In the present invention, the "dispersion stabilizer" is a solvent-soluble vinyl resin which constitutes a protective layer sorrounding the disperse particles as described hereinafter and which has a component compatible with the disperse particles or is chemically bonded to the disperse particles. The stabilizer is formed by the polymerization of (i) an N-alkoxymethylated monomer of an $\alpha,\beta$-monoethylenically unsaturated carboxylic acid amide with (ii) an $\alpha,\beta$-monoethylenically unsaturated monomer other than the monomer (i), in an aliphatic hydrocarbon solvent. In the present invention, the term "solvent-soluble" resin means that the resin is soluble or partially soluble in the above-mentioned hydrocarbon solvent.

The N-alkoxymethylated monomer of an $\alpha,\beta$-monoethylenically unsaturated carboxylic acid amide (i) is preferably reacted in an amount of from 5 to 30% by weight, more preferably from 8 to 25% by weight, based on the total monomer mixture of the monomers (i) and (ii). If the monomer (i) is less than 5% by weight, the transparency of the coating film tends to be poor, and the cross-linking reaction with a hydroxyl group in the disperse particle component tends to be in adequate when the composition of the present invention is used as a thermosetting composition. Further, the solvent resistance of the coating film tends to be poor. On the other hand, if the amount exceeds 30% by weight, gelation is likely to take place during the graft polymerization step for the preparation of the disperse particles.

Specific Examples of the monomer component (i) include N-alkoxymethylated products of $\alpha,\beta$-monoethylenically unsaturated carboxylic acid amides such as N-methoxymethyl (meth)acrylamide, N-ethoxymethyl (meth)acrylamide, N-n-propoxymethyl (meth)acrylamide, N-isopropoxymethyl (meth)acrylamide, N-n-butoxymethyl (meth)acrylamide, N-sec-butoxymethyl (meth)acrylamide, N-t-butoxymethyl (meth)acrylamide and N-isobutoxymethyl (meth)acrylamide, or their N-methylol derivatives. The term "(meth)acrylamide" refers to both acrylamide and methacrylamide. These monomers may be used alone or in combination as a mixture of at least two different kinds.

The monomer component (i) is required to be present in the system in combination with the hydroxyl group in the disperse particles, i.e. the hydroxyalkyl monomer of an $\alpha,\beta$-monoethylenically unsaturated carboxylic acid, whereby the storage stability of the composition can be improved and the coating film can be made to be transparent. Further, in a case where the composition of the present invention is employed as a thermosetting composition, the two components react with each other for cross-linking when heated.

In the present invention, the $\alpha,\beta$-monoethylenically unsaturated monomer (ii) other than monomer (i) is usually selected from the monomers (v) and (vi) as describied hereinafter. It may be any monomer so long as it is capable of rendering the vinyl resin as the dispersion stabilizer to be soluble in an aliphatic hydrocarbon solvent.

Espesially, it is preferred to use partially an α,β-monoethylenically unsaturated monomer (v) represented by the general formula:

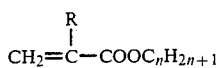

where R is H or CH₃, and n is an integer of 6 to 18.

The monomer (v) is particularly preferred to render the dispersion stabilizer to be soluble in the above-mentioned solvent.

The monomer (v) having such a specific general formula is usually used in an amount of from 5 to 60% by weight, based on the mixture of the α,β-monoethylenically unsaturated monomers (i) and (ii). If the amount is less than the lower limit of 5% by weight, no adequate effectiveness will be obtained to improve the solubility of the dispersion stabilizer in the solvent. On the other hand, if the amount exceeds the upper limit of 60% by weight, the film properties such as the hardness and impact resistance tend to decrease, such being also undesirable.

Specific examples of the monomer (v) include esters such as 2-ethylhexyl(meth)acrylate, n-octyl(meth)acrylate, lauryl(meth)acrylate, dodecyl(meth)acrylate, and stearyl(meth)acrylate. The term "(meth)acrylate" refers to both acrylate and methacrylate. These esters may be used alone or in combination as a mixture of at least two different kinds.

The above-mentioned mixture of the α,β-monoethylenically unsaturated monomers (i) and (ii), may include from 10 to 90% by weight of a monomer (vi) other than the above-mentioned N-alkoxymethylated monomer of an α,β-monoethylenically unsaturated carboxylic acid amide (i) and the above-mentioned monomer (v) represented by the above general formula.

Specific examples of such a monomer (vi) include α,β-monoethylenically unsaturated carboxylic acids such as acrylic acid, methacrylic acid, itaconic acid, maleic acid and fumaric acid; and monomers such as methyl (meth)acrylate, ethyl (meth)acrylate, n-propyl (meth)acrylate, isopropyl (meth)acrylate, n-butyl (meth)acrylate, sec-butyl (meth)acrylate, t-butyl (meth)acrylate, isobutyl (meth)acrylate, N-N'-dimethylaminoethyl (meth)acrylate, glycidyl (meth)acrylate, cyclohexyl (meth)acrylate, phenyl methacrylate, benzyl methacrylate, a dialkylester of fumaric acid such as dibutyl fumarate, styrene, vinyl toluene, α-methylstyrene, (meth)acrylonitrile and vinyl acetate. These monomers may be used alone or in combination as a mixture of at least two different kinds.

Further, as the monomer (vi), there may be mentioned, in addition to the above, hydroxyl group-containing monomers such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, 5-hydroxypentyl (meth)acrylate, 6-hydroxyhexyl (meth)acrylate, neopentylglycol mono(meth)acrylate, 3-butoxy-2-hydroxypropyl (meth)acrylate, 2-hydroxy-1-phenylethyl (meth)acrylate, polypropyleneglycol mono(meth)acrylate and glycerinemono (meth)acrylate. However, when used in combination with the N-alkoxymethylated monomer of an α,β-monoethylenically unsaturated carboxylic acid amide (i), these monomers tend to render the dispersion stabilizer hardly soluble in the solvent and tend to increase the viscosity, and accordingly their use should be avoided or restricted to a level of not greater than 5% by weight in the mixture of the monomers (i) and (ii).

The solvent-soluble vinyl resin useful as the dispersion stabilizer in the present invention (hereinafter sometimes referred to simply as "vinyl resin") may be prepared by subjecting the above-mentioned monomer components (i) and (ii) to usual solution polymerization. For instance, there may be employed a method wherein in a mixture of a part of the monomers (mixture) and a polymerization solvent, the rest of the monomers (mixture) and a polymerization initiator are dropwise added for polymerization, or method wherein the monomers (mixture) and a polymerization initiator are dropwise added to a polymerization solvent for polymerization. In any case, the present invention is not restricted to any particular solution polymerization method. The solvent to be used for such a solution polymerization, is the above-mentiond aliphatic hydrocarbon solvent. As the polymerization initiator, there may be mentioned organic peroxides such as benzoyl peroxide, t-butylperbenzoate, t-butylperoxybenzoate, t-butylperoxyoctate and lauroylperoxide, or azo compounds such azobisisobutyronitrile. These polymerization intiators may be used alone or in combination as a mixture of at least two different kinds.

In the present invention, if necessary, a chain transfer agent such a dodecylmercaptan, thioglycolic acid-2-ethylhexyl or carbon tetrachloride, may be used for controlling the molecular weight.

The solution polymerization is preferably conducted at a temperature of from 60° to 150° C. for 5 to 15 hours.

On the other hand, the "disperse particles" of the present invention are made of a copolymer which is insoluble in the above-mentioned aliphatic hydrocarbon solvent and which is selected from (a) a polyester-modified vinyl copolymer containing a hydroxyl group, (b) a vinyl copolymer containing a hydroxyl group and (c) a vinyl ester-modified vinyl copolymer containing a hydroxyl group.

Firstly, the non-aqueous dispersion type resin composition of the present invention wherein "(a) the polyester-modified vinyl copolymer containing a hydroxyl group" is used for the disperse particles, will be described.

Such a non-aqueous dispersion type resin composition may be obtained by graft polymerizing (iii) a hydroxyalkylester monomer of an α,β-monoethylenically unsaturated carboxylic acid, (iv) an α,β-monoethylenically unsaturated monomer other than the monomer (iii) and an unsaturated polyester component which is insoluble in an aliphatic hydrocarbon solvent, in the presence of the vinyl resin as the dispersion stabilizer dissolved or partially dissolved in the aliphatic hydrocarbon solvent, which has been prepared as mentioned above.

In order to permit the non-aqueous dispersion type resin composition to undergo a cross-linking reaction (i.e. a self cross-linking reaction) with the N-alkoxymethylated monomer of an α,β-monoethylenically unsaturated carboxylic acid amide (i) contained in the above-mentioned dispersion stabilizer, at the time of the film forming operation and to render the coating film formed by room temperature drying or thermosetting to be transparent, it is necessary to incorporate hydroxyl groups in the disperse particles. For this purpose, a hydroxy alkyl ester monomer (iii) of an α,β-monoethylenically unsaturated carboxylic acid is used as a component of the above-mentioned monomer mixture [(iii)+(iv)].

The monomer (iii) has a strong polarity. Accordingly, the copolymer containing this monomer has a component is hardly soluble in an aliphatic hydrocarbon solvent, and thus suitable for forming disperse particles.

Such a monomer (iii) is preferably used in an amount of from 3 to 30% by weight in the mixture of the $\alpha,\beta$-monoethylenically unsaturated monomers (iii) and (iv), so that the hydroxyl value of the non-aqueous dispersion type resin composition becomes to be from about 10 to about 100.

The "hydroxyl value" of the non-aqueous dispersion type resin composition is the sum of the hydroxyl value in the disperse particles (i.e. the graft polymer composed of the monomers (iii) and (iv) and the unsaturated polyester) and the hydroxyl value in the dispersion stabilizer (i.e. the copolymer of the monomers (i) and (ii)).

If the amount of the monomer (iii) in the above-mentioned mixture, is less than 3% by weight, the transparency of the coating film thereby obtainable tends to decrease, and the cross-linking density during the reaction with the cross-linkable monomer at the time of the coating film-forming operation, tends to be small, and accordingly, solvent resistance of the coating film will be poor. On the other hand, if the amount exceeds 30% by weight, the composition of the present invention tends to be highly viscous, thus leading to a trouble in the coating operation. In addition, when the composition of the present invention is used as a thermosetting composition, the cross-linking density after the thermosetting reaction tends to be too high, and the flexibility and water resistance of the formed film tend to be poor.

Specific examples of such monomer (iii) include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, 5-hydroxypentyl (meth)acrylate, 6-hydroxyhexyl (meth)acrylate, neopentylglycol mono(meth)acrylate, 3-butoxy-2-hydroxypropyl (meth)acrylate, 2-hydroxy-1-phenylethyl (meth)acrylate, polypropyleneglycol mono(meth)acrylate and monoglycerol mono(meth)acrylate. These monomers may be used alone or in combination as a mixture of at least two different kinds.

Further, the monomer (iv) other than the above-mentioned hydroxyalkylester of an $\alpha,\beta$-monoethylenically unsaturated carboxylic acid, to be used for the copolymerization in the presence of the dispersion stabilizer, is used preferably in an amount of from 70 to 97% by weight in the monomer mixture [(iii)+(iv)].

Specific examples of the monomer (iv) includes $\alpha,\beta$-monoethylenically unsaturated carboxylic acids such as acrylic acid, methacrylic acid, itaconic acid, maleic acid and fumaric acid; alkyl esters of acrylic or methacrylic acid such as methyl (meth)acrylate, ethyl (meth)acrylate, n-propyl (meth)acrylate, isopropyl (meth)acrylate, n-butyl (meth)acrylate, sec-butyl (meth)acrylate, t-butyl (meth)acrylate, isobutyl (meth)acrylate, n-hexyl (meth)acrylate, 2-ethylhexyl (meth)acrylate, n-octyl (meth)acrylate, lauryl (meth)acrylate, tridecyl (meth)acrylate and stearyl (meth)acrylate; and N,N'-dimethylaminoethyl (meth)acrylate, glycidyl (meth)acrylate, cyclohexyl (meth)acrylate, phenyl methacrylate, benzyl methacrylate, dialkylesters of fumaric acid such as dibutyl fumarate, styrene, vinyl toluene, $\alpha$-methylstyrene, (meth)acrylonitrile and vinyl acetate. These monomers may be used alone or in combination as a mixture of at least two different kinds depending upon the particular purpose or application of the coating composition.

The monomer (iv) includes an N-alkoxymethylated monomer of an $\alpha,\beta$-monoethylenically unsaturated carboxylic acid amide. However, such a monomer tends to increase the viscosity of the system during the preparation of the disperse particles, and its use should better be avoided.

In the present invention, the "polyester-modified vinyl copolymer containing a hydroxyl group" to be used as the disperse particle component, may be prepared by graft-polymerizing the above-mentioned monomers (iii) and (iv) to an unsaturated polyester insoluble in an aliphatic hydrocarbon solvent (hereinafter referred to as "a solvent-insoluble unsaturated polyester"), and thus it is capable of imparting flexibility and superior outer appearance of the polyester resin to the resulting coating film.

The solvent-insoluble unsaturated polyester to be used in the present invention is obtainable by a usual condensation reaction of a polybasic acid (which may contain a mono basic acid, if necessary) with a polyhydric alcohol. Any unsaturated polyester thus obtained, may be usuful so long as it is insoluble in the aliphatic hydrocarbon.

An $\alpha,\beta$-unsaturated dicarboxylic acid is used as a starting material for the unsaturated polyester to be used in the specific embodiment of the present invention. This component is usually used in an amount of from 1 to 10% by weight preferably from 2 to 7% by weight, in the unsaturated polyester. If the component is less than 1% by weight, such an amount is not adequate relative to the mixture of the $\alpha,\beta$-monoethylenically unsaturated monomers for the preparation of the polyester-modified vinyl copolymer as the disperse particle component. Accordingly, the polyester-modification tends to be inadequate, and consequently the product will have a composition wherein the unsaturated polyester is blended with a copolymer obtained from the mixture of $\alpha,\beta$-monoethylenically unsaturated monomers (iii) and (iv), whereby the coating film is likely to be opaque, or when the composition of the present invention is used as a thermosetting composition, the coating property, particularly the adhesion, tends to be poor because of the difference in the reactivity with the cross-linkable group in the dispersion stabilizer. On the other hand, if the component is greater than 10% by weight, gelation tends to take place during the graft polymerization with the $\alpha,\beta$-monoethylenically unsaturated monomer mixture [(iii)+(iv)].

Specific examples of such a component includes fumaric acid, (anhydrous) maleic acid, itaconic acid, glutaconic acid and (anhydrous) citraconic acid. These acids may be used alone or in combination as a mixture of at least two different kinds.

In the synthesis of the unsaturated polyester to be used in the present invention, the carboxylic acid component other than the above-mentioned acid is preferably reacted in an amount of from 29 to 69% by weight. Specific examples of such a component include phthalic acid (anhydride), isophthalic acid, trimellitic acid (anhydride), pyromellitic acid (anhydride), tetrahydrophthalic acid (anhydride), hexahydrophthalic acid (anhydride), methyltetrahydrophthalic acid (anhydride), methylhexahydrophthalic acid (anhydride), 3,6- endomethylene-tetrahydrophthalic anhydride succinic acid (anhydride), adipic acid, sebacic acid, benzoic acid, p-tert-butyl benzoic acid, isononanoic acid and a saturated synthetic tertiary monocarboxylic acid (e.g. a product manufactured and sold under tradename "Versatic Acid" by Shell Chemical Company). The term "acid (anhydride)" refers to both acid and its anhydride. These acids may be used alone or in combination as a mixture of at least two different kinds.

In the synthesis of the unsaturated polyester to be used in the present invention, the polyhydric alcohol component is preferably used in an amount of from 30 to 70% by weight. Specific examples of such a component include ethylene glycol, diethylene glycol, propylene glycol, neopentyl glycol, dipropylene glycol, glycerol, trimethylolethane, trimethylolpropane, pentaerythritol, dipentaerythritol, butanediol, pentanediol, hexanediol, 1,4-cyclohexanedimethanol, (hydrogenated) bisphenol A, 2-ethyl-1,3-hexanediol or an adduct of bisphenol A with an alkyleneoxide. These alcohols may be used alone or in combination as a mixture of at least two different kinds. A glycidyl ester of a tertiary synthetic fatty acid (e.g. a product manufactured and sold under tradename "Cardura E" by Shell Chemical Company) may be used in combination. In addition, if necessary, animal or plant oils as well as their fatty acids, petroleum resins, rosin, phenol resins or epoxy resins may also be employed as the materials for modifying the unsaturated polyester.

The unsaturated polyester for the present invention may be prepared in a usual reaction or in a multi-stage reaction by a conventional method. There is no particular restriction to the reaction method.

The unsaturated polyester thus obtained is, in many cases, solid at room temperature. Accordingly, for convenience of handling, it is possible to use, among the above-mentioned monomers (iii) and (iv), those which are capable of dissolving the unsaturated polyester. Namely, the unsaturated polyester may be diluted or dissolved in such monomer(s). In this case, the amount of the monomer(s) (iii) and/or (iv) is included in the above-mentioned range for the preparation of the disperse particles (i.e. the monomers (iii) and (iv) and the unsaturated polyester).

When the $\alpha,\beta$-monoethylenically unsaturated monomer (iii) and/or (iv) is used as a diluent, if the temperature at the time of the dilution is high, the reaction with the unsaturated polyester is likely to proceed, thus leading to gelation, such being undesirable. In such a case, in order to suppress the reaction between the unsaturated polyester and the $\alpha,\beta$-monoethylenically unsaturated monomer (iii) and/or (iv), it is preferred to add a polymerization inhibitor in an amount of not greater than 0.4% by weight relative to the unsaturated polyester (solid content). If the amount of the polymerization inhibitor exceeds 0.4% by weight, the subsequent graft polymerization of the unsaturated polyester with the $\alpha,\beta$-monoethylenically unsaturated monomer mixture [(iii)+(iv)] will be impaired.

As the polymerization inhibitor, there may be mentioned hydroquinone, methylhydroquinone or catechol. These inhibitors may be used alone or in combination as a mixture of at least two different kinds.

The unsaturated polyester of the present invention preferably has an acid value of at most 50 (based on resin solid; the same will apply hereinafter for the designation of the acid value), a hydroxyl value of from 50 to 250, (based on resin solid; the same will apply hereinafter for the designation of the hydroxyl value of the present invention). A molecular weight of from 2,000 to 50,000 is preferred as the weight average molecular weight. The weight average molecular weight was measured by gel permeation chromatography (HLC802A model, manufactured by Toyo Soda Company Ltd.). (Hereinafter, the weight average molecular weight in the present invention was measured in a similar manner.)

In connection with the above acid value range, if the acid value is greater than 50, the alkali resistance in the final film property after the graft polymerization with the $\alpha,\beta$-monoethylenically unsaturated monomer mixture [(iii)+(iv)] tends to be poor. Further, if the hydroxyl value is lower than 50, the cross-linking of the polyester-modified vinyl copolymer obtained by the graft polymerization with the $\alpha,\beta$-monoethylenically unsaturated monomer mixture [(iii)+(iv)], tends to be insufficient. On the contrary, if the hydroxyl value exceeds 250, the water resistance of the coating film thereby obtainable tends to be poor with the increase of the polar groups.

Further, if the weight avarage molecular weight is lower than the above-mentioned lower limit of 2,000, the various characteristics of the polyester resin can not adequately be provided. On the other hand, if the weight average molecular weight exceeds 50,000, the molecular weight of the polyester resin tends to be too high that when modified with the $\alpha,\beta$-monoethylenically unsaturated monomer, the resulting non-aqueous dispersion tends to have high viscosity, thus leading to a problem from the aspect of the operation.

In the present invention, the polyester-modified vinyl resin as the above-mentioned disperse particle component, is a reaction product obtained by graft-polymerizing from 5 to 50% by weight of the above-mentioned unsaturated polyester with from 50 to 95% by weight of a monomer mixture comprising the above-mentioned $\alpha,\beta$-monoethylenically unsaturated monomers (iii) and (iv).

As mentioned above, the amount of the modifying unsaturated polyester is from 5 to 50% by weight, preferably from 7 to 40% by weight. If the amount is less than 5% by weight, the advantages attributable to the polyester resin, such as flexibility, the pigment-dispersibility and the superior outer appearance of the formed film, can not adequately be obtained. On the other hand, if the amount exceeds 50% by weight, the desired properties of the vinyl resin, such as the hardness and the stain resistance, tend to be impaired.

Further, the composition of the present invention can be obtained by polymerizing from 20 to 70% by of a mixture comprising the above-mentioned monomers (iii) and (iv) and the solvent-insoluble unsaturated polyester, in the presence of from 30 to 80% by weight of the vinyl resin (i.e. the copolymer of the monomers (i) and (ii)) as the dispersion stabilizer.

In this embodiment, if the vinyl resin as the dispersion stabilizer is less than 30% by weight, it becomes difficult to obtain a stable no-aqueous dispersion. On the other hand, if the vinyl resin exceeds 80% by weight, it becomes difficult to obtain a non-aqueous dispersion.

The temperature for the copolymerization is determined depending upon the polymerization initiator used and the type of the polymerization solvent. It is usual to conduct the copolymerization at a temperature of from 50° to 200° C., preferably from 60° to 150° C.

As the polymerization initiator, the above-mentioned organic peroxides or the azo compounds are suitably employed. Further, the above-mentioned chain transfer agent may be used to control the molecular weight.

Now, the non-aqueous dispersion type resin composition of the present invention wherein "(b) the vinyl copolymer containing a hydroxyl group" is used for the disperse particles, will be described.

Such a resin composition may be obtained by copolymerizing a mixture comprising (iii) a hydroxylalkyl ester monomer of an α,β-monoethylenically unsatrated carboxylic acid and (iv) another α,β-monoethylenically unsaturated monomer, in the presence of the vinyl resin as the dispersion stabilizer dissolved (or partially dissolved) in the aliphatic hydrocarbon solvent, which has been prepared as mentioned above.

In order to permit the non-aqueous dispersion type resin composition to undergo a reaction (i.e. a self cross-linking) with the component (i) i.e. the N-alkoxymethylated monomer of an α,β-monoethylenically unsaturated carboxylic acid amide contained in the above-mentioned dispersion stabilizer and to render the coating film formed by room temperature drying or thermosetting to be transparent, it is necessary to incorporate hydroxyl groups in the disperse particles. For this purpose, (iii) a hydroxylalkyl ester monomer of an α,β-monoethylenically unsaturated carboxylic acid is used as a component of the above-mentioned monomer mixture [(iii)+(iv)].

Such a monomer (iii) is preferably used in an amount of from 3 to 30% by weight in the mixture of the α,β-monoethylenically unsaturated monomers (iii) and (iv), so that the hydroxyl value of the non-aqueous dispersion of the vinyl copolymer becomes to be from about 10 to about 100.

The "hydroxyl value" of the non-aqueous dispersion of the vinyl copolymer is the sum of the hydroxyl value in the disperse particles (i.e. the copolymer composed of the monomers (iii) and (iv)) and the hydroxyl value in the dispersion stabilizer.

The amount of the monomer (iii) is specified for the same reason as mentioned above with respect to the disperse particles made of the polyester-modified vinyl copolymer.

Further, the component (iv) i.e. the monomer other than the above-mentioned hydroxyalkyl ester of an α,β-monoethylenically unsaturated carboxylic acid, to be used for the copolymerization in the presence of the dispersion stabilizer, is used preferably in an amount of from 70 to 97% by weight.

As the monomers (iii) and (iv) to be used for the preparation of the above-mentioned vinyl copolymer containing a hydroxyl group, there may be employed those which are mentioned hereinabove.

As the monomer (iv), it should better be avoided to use the N-alkoxymethylated monomer of an α,β-monoethylenically unsaturated carboxylic acid amide, since it tends to lead to an increase of the viscosity at the time of the preparation of disperse particles.

The non-aqueous dispersion type resin composition of this embodiment is obtainable by copolymerizing from 20 to 70% by weight of a mixture of the monomers (iii) and (iv) in the presence of from 30 to 80% by weight of the solvent-soluble vinyl resin as the dispersion stabilizer.

The temperature for the copolymerization for the production of disperse particles, is determined by the polymerization initiator to be used and the type of the polymerization solvent. It is usual to conduct the copolymerization at a temperature within a range of from about 50° to about 200° C., preferably from about 60° to about 150° C.

As the polymerization initiator, the above-mentioned organic peroxides or the azo compounds are suitably used. Further, the above-mentioned chain transfer agent may also be employed to control the molecular weight.

Now, the non-aqueous dispersion type resin composition of the present invention wherein "(c) a vinyl ester-modified vinyl copolymer containing a hydroxyl group" is used for the disperse particles, will be described.

Such a composition can be obtained by polymerizing (iii) the hydroxyalkyl ester monomer of an α,β-monoethylenically unsaturated carboxylic acid, (iv) an α,β-monoethylenically unsaturated monomer other than the monomer (iii), and the vinyl ester component, in the presence of the vinyl resin as the dispersion stabilizer dissolved (or partially dissolved) in the aliphatic hydrocarbon.

In order to permit the composition to undergo a cross-linking reaction (i.e. a self cross-linking reaction) with the N-alkoxymethylated monomer of an α,β-monoethylenically unsaturated carboxylic acid amide (i) contained in the above-mentioned dispersion stabilizer, at the time of the film forming operation and to render the coating film formed by room temperature drying or thermosetting to be transparent, it is necessary to incorporate hydroxyl groups in the disperse particles. For this purpose, a hydroxyalkyl ester monomer (iii) of an α,β-monoethylenically unsaturated carboxylic acid is used as a component of the above-mentioned monomer mixture [(iii)+(iv)].

Such a monomer (iii) is preferably used in an amount of from 3 to 30% by weight in the mixture of the α,β-monoethylenically unsaturated monomers (iii) and (iv), so that the hydroxyl value of the disperse particle component becomes to be from about 8 to about 140.

Further, the monomer (iv) other than the above-mentioned hydroxyalkyl ester of an α,β-monoethylenically unsaturated carboxylic acid, to be used for the copolymerization in the presence of the dispersion stabilizer, is used preferably in an amount of from 70 to 97% by weight in the monomer mixture [(iii)+(iv)].

The monomers (iii) and (iv) may be the same as mentioned above with respect to the preparation of disperse particles made of the polyester-modified vinyl copolymer.

As the monomer component (iv), it should better be avoided to employ the N-alkoxymethylated monomer of an α,β-monoethylenically unsaturated carboxylic acid amide, since it tends to lead to an increase of the viscosity at the time of the preparation of disperse particles.

In the present invention, "(c) the vinyl ester-modified vinyl copolymer containing a hydroxyl group" is obtained by polymerizing the above-mentioned monomers (iii) and (iv) to the vinyl ester, and thus it is capable of imparting the superior properties of the vinyl ester such as the alkali resistance, the acid resistance, the salt water resistance and the salt spray resistance to the resulting coating film.

The vinyl ester to be used in the present invention is a reaction product of (a) an epoxy compound containing at least one epoxy group in the molecule, with (b) an unsaturated monocarboxylic acid, and may be any one of the known vinyl esters.

The synthesis of the vinyl ester may be conducted by a known esterification reaction.

For instance, an epoxy compound and an unsaturated monocarboxylic acid are heated and reacted in an atmosphere of air in the presence of an esterification catalyst and, if necessary, a polymerization inhibitor, a solvent or a monomer (hereinafter referred to as a "polymerizable monomer") which is selected from the above-mentioned monomers (iii) and (iv) and which can be used as a solvent for the esterification reaction, and then, if necessary, the reaction product is diluted with a solvent or the polymerizable monomer.

In the synthesis of the vinyl ester, the reaction ratio of the unsaturated monocarboxylic acid to the epoxy compound having at least one epoxy group in the molecule is such that from 0.6 to 1.2 mols of the carboxyl group is used relative to one mol of the epoxy group. From the aspect of the performance, the preferred range is in the vicinity of 1 mol. The unsaturated monocarboxylic acid may, partially or in its substantial portion, be substituted by other carboxylic acids or carboxylic acid anhydrides.

The amount of the polymerization inhibitor, the solvent or the polymerizable monomer may optionally be selected depending upon the desired operability or coating film properties.

As the epoxy compound useful for the synthesis of the above-mentioned vinyl ester, there may be mentioned, for instance, (1) a bisphenol type compound synthesized by the reaction of bisphenol A with epichlorohydrin or methylepichlorohydrin, such as the ones known by the trade names Epikote #827, #828, #834, #1001, #1004, #1007 and #1009, manufactured by Yuka Shell Epoxy Co., the ones known by the trade names ERL #2772 and #2774 and EKR 2002, manufactured by Union Carbide Co., the ones known by the trade names Araldite GY-#250, #260, #280, #6071, #6084 and #6099, manufactured by Ciba Geigy Corp., the ones known by the trade names AER #330, #331, #332, #661 and #664, manufactured by Asahi Chemical Industry Co., Ltd. or the ones known by the trade names Epiclon #800, #1000 and #4000, manufactured by Dainippon Ink & Chemicals Inc., (2) a compound obtained by reacting a phenol with formaldehyde in the presence of an acidic or alkaline catalyst to obtain a novolak or resol and reacting thus obtained novolak or resol with epichlorohydrin or methylepichlorohydrin, such as the ones known by the trade names DEN #431, #438 and #448, manufactured by Dow Chemical Co. or the ones known by the trade names ECN #1235, #1273, #1280 and #1290, manufactured by Ciba Geigy Corp., (3) a compound obtained by reacting a halogenated phenol with epichlorohydrin or methylepichlorohydrin, such as the ones known by the trade names DER #511, #542 and #580, manufactured by Dow Chemical Co. or the ones known by the trade names Araldite #8011 and #8047, manufactured by Ciba Geigy Corp., and (4) a compound obtained by reacting epichlorohydrin or methylepichlorohydrin with an addition product of a phenol with ethylene oxide or propylene oxide, such as the one known by the trade names EP #4000 and #4001, manufactured by Asahi Electro-Chemical Co., Ltd. These epoxy compounds may be used alone or in combination as a mixture.

As the unsaturated monocarboxylic acid to be reacted with the above-mentioned epoxy compound, there may be mentioned acrylic acid, methacrylic acid or crotonic acid. Monoesters of unsaturated polybasic caboxylic acids such as monoethyl maleate, may also be employed. These acids may be used alone or in combination as a mixture.

As the polymerization inhibitor to be used for the synthesis of the vinyl ester, there may be mentioned hydroquinones such as hydroquinone, quinones such as benzoquinone, phenols such as hydroquinone monomethyl ether or $\alpha$-naphthol, organic or inorganic copper salts such as copper naphthenate, amidines such as acetoamidine acetate, and quarternary ammonium salts such as trimethylbenzylammonium chloride or laurylpyridinium chloride. These inhibitors may be used alone or in combination as a mixture. The polymerization inhibitor is usually used in an amount of from about 0.001 to about 0.5 part by weight, preferably from 0.005 to 0.05 part by weight, per 100 parts by weight of the reactants.

The catalyst for the reaction of the synthesis of the vinyl ester, includes tertiary amines such as triethylamine, benzyldimethylamine or 2,4,6-tris(dimethylaminomethyl)phenol. These catalysts may be used alone or in combination as a mixture.

For the synthesis of the vinyl ester, 1 mol of the epoxy group of the epoxy compound is reacted with from 0.6 to 1.2 mols of the carboxyl group of the unsaturated monocarboxylic acid under heating at a reaction temperature of from 50° to 180° C., preferably from 80° to 140° C. The amount of the polymerization inhibitor to be used for this reaction is within the above-mentioned range. Further, the catalyst for the esterification reaction is used in an amount of from about 0.001 to 5.0 parts by weight, relative to 100 parts by weight of the reactants. However, good results are obtainable within a range of from about 0.005 to about 1.0 parts by weight.

Further, in the case of the reaction wherein a solvent or polymerizable monomer is added during the reaction, it is advantageous, from the view of the reaction velocity, to use the solvent or polymerizable monomer in a minimum amount although it depends upon the reactants. The end of the reaction may be determined by measuring the acid value. From the performance point of view, it is usually preferred that the acid value at the termination of the reaction is at most 20.

When the reaction has terminated, a polymerization inhibitor is added, as the case requires, and after completely dissolving it, the cooling will be started. After the initiation of the cooling, a solvent or polymerizable monomer may be added as the case requires, and after dissolving it, the reaction mixture is cooled to room temperature. The amount of the solvent or polymerizable monomer is determined depending upon the desired viscosity, operability, curability, etc. The polymerizable monomer is usually employed in an amount of from 10 to 70% by weight, based on the total amount of the vinyl ester and the polymerizable monomer. In this case, a part of the monomers (iii) and (iv) is used as a solvent for the preparation of the vinyl ester, as mentioned above. Since such a polymerizable monomer is also a starting material for the vinyl ester-modified vinyl copolymer, its amount must be adjusted so that the total amount of the polymerizable monomer and other monomers (iii) and (iv) falls within the specified range. Such polymerizable monomers may be used alone or in combination as a mixture of at least two different kinds.

Further, as the solvent to be used for the esterification reaction, there may be employed any solvent so long as it does not interfere with the preparation of the disperse particles.

Such organic solvents include hydrocarbon solvents such as heptane, octane, mineral spirit, toluene or xylene; alcohol solvents such as propyl alcohol or butyl alcohol; ester solvents such as ethyl acetate or butyl acetate; ketone solvents such as acetone or methyl ethyl ketone, and other organic solvents such as alcohol ester solvents or ether-ester solvets. The solvents are not restricted to any particular kinds, so long as they do not impair the stability of the non-aqueous dispersion type resin composition of the present invention.

The vinyl ester to be used in the present invention is the reaction product thus obtained. Commercial products may usually be employed without any trouble.

As such commercial products, there may be mentioned, for instance, the ones known by the trade names Ripoxy R802, R806 and H-600, manufactured by Showa Kobunshi K.K., the ones known by the trade names Diclite UE-5101, UE-5210 and UE-3520, manufactured by Dainippon Ink & Chemicals Inc., the one known by the trade name Epolac RF-1001, manufactured by Nippon Shokubai Kagaku Kogyo Co., Ltd., the ones known by the trade names Neopol 8250L, 8250H, 8411L and 8411H, manufactured by Nippon Yupika K.K., the ones known by the trade names Polyset 6000K, 6100, 6200 and PS-6120S, manufactured by Hitachi Chemical Co., Ltd., the ones known by the trade names Prominate P-310 and P-311, manufactured by Takeda Chemical Industries Ltd., the ones known by the trade names Derakane 411, 411C, 470 and 510, manufactured by Dow Chemical Co., and the one known by the trade name Sumiup EVR-911, manufactured by Sumitomo Chemical Industries Co., Ltd. These commercial products may be used alone or in combination as a mixture of at least two different kinds.

In the present invention, the vinyl ester-modified vinyl copolymer as the above-mentioned disperse particle component, is a reaction product of the polymerization of from 3 to 25% by weight of the above-mentioned vinyl ester with from 75 to 97% by weight of the mixture of the $\alpha,\beta$-monoethylenically unsaturated monomers (iii) and (iv).

As mentioned above, the amount of the modifying vinyl ester is within a range of from 3 to 25% by weight, preferably from 5 to 20% by weight. If the amount is less than 3% by weight, the superior properties of the vinyl ester resin such as the alkali resistance, the acid resistance, the salt water resistance and salt spray resistance, can not adequately be provided. On the other hand, if the amounts exceeds 25% by weight, it is likely that the characteristic properties of the vinyl resin such as the weather resistance and stain resistance are impaired, or the viscosity increases at the time of the preparation of the disperse particles, such being also undesirable.

The non-aqueous dispersion type resin composition of the present invention is obtained by polymerizing from 20 to 70% by weight of a mixture comprising the above-mentioned monomers (iii) and (iv) and the vinyl ester in the presence of from 80 to 30% by weight of the vinyl resin (i.e. the copolymer of the monomers (i) and (ii)) as the dispersion stabilizer.

If the vinyl resin as the dispersion stabilizer is less than 30% by weight, it becomes difficult to obtain a stable non-aqueous dispersion. On the other hand, if the vinyl resin exceeds 80% by weight, it becomes difficult to obtain a non-aqueous dispersion, such being likewise undesirable.

The temperature for the above-mentioned copolymerization is determined depending upon the type of the polymerization initiator and solvent used. The copolymerization is usually conducted at a temperature of from 50° to 200° C., preferably from 60° to 150° C.

As the polymerization initiator, the above-mentioned organic peroxides or azo compounds may suitably be employed. Further, the above-mentioned chain transfer agent may be used for controlling the molecular weight.

The non-aqueous dispersion type resin composition of the present invention thus obtained, is capable of forming a coating film having excellent transparency by virtue of the introduction of the respective monomers having specific functional groups to the dispersion stabilizer and the disperse particles, respectively, in spite of the fact that the polarity is different as between the dispersion stabilizer and the disperse particles. Further, if necessary, a known catalyst to promote the cross-linking reaction (i.e. the self cross-linking) and one or more film-forming resins such as an epoxy resin, a cellulose resin, a polyester resin, an alkyd resin, an amino resin and a block isocyanate compound, may also be incorporated into the non-aqueous dispersion type resin composition of the present invention.

In addition to the organic solvents contained in the resepctive components of the composition of the present invention, it is possible to incorporate a further organic solvent, if necessary, to such an extent that the stability of the composition will not be impaired. As such an organic solvent, there may be employed an organic solvent which is the same as or different from the one contained in the respective components.

Usuful organic solvents include hydrocarbon solvents such as heptane, octane, mineral spirit, toluene or xylene; alcohol solvents such as propyl alcohol or butanol; ester solvents such as ethyl acetate or butyl acetate; ketone solvents such as acetone or methyl ethyl ketone and other organic solvents such as an alcohol-ester type or an ether-ester type. The organic solvents are not restricted to any paticular type so long as they do not adversely affect the stability of the non-aqueous dispersion.

In addition, there may be added, if necessary, to the non-aqueous dispersion type resin composition of the present invention, inorganic or organic coloring pigments, metal powder pigments such as aluminum fragments, extenders and other additives which are commonly employed for coatings compositions.

For the application of the non-aqueous dispersion type resin composition of the present invention, there may be employed various known coating methods such as brush coating, spray coating, electrostatic coating, curtain flow coating, shower coating and roll coating.

Further, it is possible to conduct the coating by heating the composition to a temperature of from 30° to 60° C. for hot spraying.

Then, the composition of the present invention may be dried at room temperature or cured under heating, whereby coating film can be formed. In the case of curing the composition by heating, the composition is usually heat treated at a proper temperature within a range of from 60° to 200° C. for 10 to 40 minutes depending upon the content of the cross-linkable functional groups in the composition or the film thickness, whereby a cured coating film will be obtained.

As described in the forgoing, by the introduction of the N-alkoxymethyl group into the dispersion stabilizer and the hydroxyl group into the disperse particles, the composition of the present invention provides the following specific effects:

(1) At the time of the preparation of the non-aqueous dispersion type resin composition, the N-alkoxymethyl group and the hydroxyl group partially react with each other to prevent the separation of the dispersion stabilizer and the disperse particles, whereby it is possible to obtain a composition having superior storage stability.

(2) By the presence of both the N-alkoxymethyl group and the hydroxyl group, the transparency of the coating film thereby obtainable can remarkably be improved.

(3) When the composition is thermoset, N-alkoxymethyl group and the hydroxyl group undergo cross-linking (i.e. self cross-linking), whereby a coating film having superior properties can be obtained.

Now, the present invention will be described in further detail with reference to Examples. However, it should be understood that the present invention is by no means restricted by these specific Examples.

In the Examples "parts" or "%" means "parts by weight" or "% by weights", respectively.

PREPARATION OF VINYL RESIN DISPERSION STABILIZERS (1) A reaction vessel equipped with a stirrer, a thermometer, a dropping funnel and a condenser was charged with 100 parts of mineral spirit, and the temperature was raised to 90° C. Then, a mixture of the following monomers and initiator was added dropwise over a period of 3 hours:

| Isobutyl methacrylate | 17 parts |
|---|---|
| Butyl methacrylate | 35 parts |
| Methyl methacrylate | 5 parts |
| Ethyl acrylate | 5 parts |
| Styrene | 8.5 parts |
| 2-Ethylhexyl acrylate | 19 parts |
| N—n-butoxymethylacryl amide | 8 parts |
| Acrylic acid | 2.5 parts |
| Benzoyl peroxide | 2 parts |

After the completion of the dropwise addition, 1.2 parts of benzoyl peroxide was further added, and the reaction was conducted at the same temperature for further 4 hours. Thus, a resin solution having an acid value of 21.1, a weight average molecular weight of 53,800 and a non-volatile content of 50.1%, and the viscosity of the solution was 15.7 stokes poise/20° C. This solution was designated as A-1.

(2) A reaction vessel similar to the one used for the synthesis of A-1, was charged with 100 parts of mineral spirit, and the temperature was raised to 85° C. Then, a mixture of the following monomers and initiator was added dropwise over a period of 3 hours:

| Butyl methacrylate | 48 parts |
|---|---|
| t-Butyl methacrylate | 8 parts |
| 2-Ethylhexyl methacrylate | 22 parts |
| Butyl acrylate | 3 parts |
| N—n-butoxymethylacryl amide | 19 parts |
| Dodecylmercaptan | 0.2 part |
| Benzoyl peroxide | 2.5 parts |
| Azobisisobutyronitrile | 0.5 part |

After the compeletion of the dropwise addition, 1.2 parts of benzoyl peroxide was further added, and the reaction temperature was raised to 90° C. Then, the reaction was conducted for further 4 hours, whereby a resin solution having an acid value of 1.8, a weight average molecular weight of 65,300 and a non-volatile content of 49.7%, was obtained. The viscosity of the resin solution was 16.7 stokes poise/20° C. This solution was designated as A-2.

(3) A reaction vessel similar to the one used for the synthesis of A-1, was charged with 100 parts of mineral spirit, and the temperature was raised to 90° C. Then, a mixture of the following monomers and initiator was added dropwise over a period of 3 hours:

| Methyl methacrylate | 4 parts |
|---|---|
| Isobutyl methacrylate | 20 parts |
| 2-Ethylhexyl methacrylate | 20 parts |
| Styrene | 15 parts |
| Butyl methacrylate | 30 parts |
| N—n-butoxymethylacryl amide | 10 parts |
| Acrylic acid | 1 part |
| Benzoyl peroxide | 2 parts |
| Azobisisobutyronitrile | 1 part |

After the completion of the dropwise addition, 1.2 parts of benzoyl peroxide was further added, and the reaction was conducted at the same temperature for further 4 hours, whereby a resin solution having an acid value of 9.3, a weight average molecular weight of 52,500 and a non-volatile content of 50.3%, was obtained. The viscosity of the resin solution was 13.1 stokes poise/20° C. This solution was designated as A-3.

(4) A reaction vessel similar to the one used for the synthesis of A-1, was charged with 100 parts of mineral spirit, and the temperature was raised to 85° C. Then, a mixture of the following monomers and initiator was added dropwise over a period of 3 hours:

| Methyl methacrylate | 10 parts |
|---|---|
| 2-Ethylhexyl acrylate | 15 parts |
| Styrene | 10 parts |
| 2-Ethylhexyl methacrylate | 15 parts |
| Isobutyl methacrylate | 33.5 parts |
| N—t-butoxymethylacryl amide | 15 parts |
| Acrylic acid | 1.5 parts |
| Benzoyl peroxide | 2 parts |
| Azobisisobutyronitrile | 1 part |

After the completion of the dropwise addition, 1.2 parts of benzoyl peroxide was further added, and the reaction temperature was raised to 90° C. Then, the reaction was conducted for further 4 hours, whereby a resin solution having an acid value of 13.3, a weight average molecular weight of 67,700 and a non-volatile content of 49.8%, was obtained. The viscosity of the resin solution was 18.4 stokes poise/20° C. This solution was designated as a A-4.

(5) A reaction vessel similar to the one used for the synthesis of A-1, was charged with 100 parts of mineral spirit, and the temperature was raised to 90° C. Then, a mixture of the following monomers and initiator was added dropwise over a period of 3 hours:

| Isobutyl methacrylate | 17 parts |
|---|---|
| Butyl methacrylate | 35 parts |
| Methyl methacrylate | 5 parts |
| Ethyl acrylate | 5 parts |
| Styrene | 8.5 parts |

| | |
|---|---|
| 2-Ethylhexyl acrylate | 19 parts |
| N—n-butoxymethylacryl amide | 8 parts |
| Acrylic acid | 2.5 parts |
| Benzoyl peroxide | 2 parts |

After the completion of the dropwise addition, 1.2 parts of benzoyl peroxide was further added, and the reaction was conducted at the same temperature for further 4 hours, whereby a resin solution having an acid value of 18.0, a weight average molecular weight of 55,700 and a non-volatile content of 50.0%, was obtained. The viscosity of the resin solution was 15.9 stokes poise/20° C. This solution was designated as A-5.

(6) A reaction vessel similar to the one used for the synthesis of A-1, was charged with 100 parts of mineral spirit, and the temperature was raised to 90° C. Then, a mixture of the following monomers and initiator, was added dropwise over a period of 3 hours:

| | |
|---|---|
| Methyl methacrylate | 4 parts |
| Isobutyl methacrylate | 20 parts |
| 2-Ethylhexyl methacrylate | 20 parts |
| Styrene | 15 parts |
| Butyl methacrylate | 30 parts |
| N—n-butoxymethylacryl amide | 10 parts |
| Methacrylic acid | 1 part |
| Benzoyl peroxide | 2 parts |
| Azobisisobutyronitrile | 1 part |

After the completion of the dropwise addition, 1.2 parts of benzoyl peroxide was further added, and the reaction was conducted at the same temperature for further 4 hours, whereby a resin solution having an acid value of 8.0, a weight average molecular weight of 54,100 and a non-volatile content of 50.0%, was obtained. The viscosity of the resin solution was 13.5 stokes poise/20° C. This solution was designated as A-6.

(7) A reaction vessel similar to the one used for the synthesis of A-1 was charged with 100 parts of mineral spirit, and the temperature was raised to 90° C. Then, a mixture of the following monomers and initiator, was added dropwise over a period of 3 hours:

| | |
|---|---|
| Isobutyl methacrylate | 20 parts |
| 2-Ethylhexyl acrylate | 30 parts |
| Styrene | 33.5 parts |
| N—n-butoxymethylacryl amide | 15 parts |
| Methacrylic acid | 1.5 parts |
| Benzoyl peroxide | 3 parts |

After the completion of the dropwise addition, 1.2 parts of benzoyl peroxide was further added, and the reaction was conducted at the same temperature for further 4 hours, whereby a resin solution having an acid value of 13.2, a weight average molecular weight of 78,900 and a non-volatile content of 49.7%, was obtained. The viscosity of this solution was 33.1 stokes poise/20° C. This solution was designated as A-7.

(8) A reaction vessel similar to the one used for the synthesis of A-1, was charged with 100 parts of mineral spirit, and the temperature was raised to 90° C. Then, a mixture of the following monomers and initiator, was added dropwise over a period of 3 hours:

| | |
|---|---|
| Isobutyl methacrylate | 20 parts |
| 2-Ethylhexyl acrylate | 30 parts |
| Methyl methacrylate | 5 parts |
| Styrene | 38.5 parts |
| N—n-butoxymethylacryl amide | 5 parts |
| Methacrylic acid | 1.5 parts |
| Benzoyl peroxide | 2.5 parts |

After the completion of the dropwise addition, 1.2 parts of benzoyl peroxide was further added, and the reaction was conducted at the same temperature for further 4 hours, whereby a resin solution having an acid value of 11.4, a weight average molecular weight of 52,200 and a non-volatile content of 49.7%, was obtained. The viscosity of this resin solution was 12.2 stokes poise/20° C. This solution was designated as A-8.

(9) The reaction was conducted in the same manner as in the preparation of A-3 except that N-n-butoxymethylacryl amide was omitted, 100 parts of mineral spirit was changed to 90 parts, and 2 parts of benzoyl peroxide and 1 part of azobisisobutyronitrile were changed to 1.2 parts of benzoyl peroxide, whereby a resin solution having an acid value of 9.3, a weight average molecular weight of 34,800 and a non-volatile content of 50.1%, was obtained. The viscosity of the resin solution was 10.5 stokes poise/20° C. This solution was designated as A-9.

(10) The reaction was conducted in the same manner as in the preparation of A-6 except that N-n-butoxymethylacryl amide was omitted, 100 parts of mineral spirit was changed to 90 parts, and 2 parts of benzoyl peroxide and 1 part of azobisisobutyronitrile were changed to 1.2 parts of benzoyl peroxide, whereby resin solution having an acid value of 7.9, a weight average molecular weight of 36,300 and a non-volatile content of 49.9%, was obtained. The viscosity of the resin solution was 10.6 stokes poise/20° C. This solution was designated as A-10.

PREPARATION OF UNSATURATED POLYESTERS (1) Unsaturated polyester No.1 (hereinafter referred to simply as "HP-1")

A reaction vessel equipped with a stirrer, a thermometer, a partial condenser and a nitrogen gas supply tube, was charged with 32.3 parts of isophthalic acid, 15.1 parts of adipic acid, 3.0 parts of fumaric acid, 22.9 parts of neopentyl glycol, 17.4 parts of trimethylol propane and 9.3 parts of Cardura E (trade name, manufactured by Shell Chemical Company). The mixture was heated to 240° C. under a nitrogen gas atmosphere and reacted at the same temperature for about 10 hours. Then, the reaction product was cooled to 180° C., and hydroquinone was added in an amount of 0.06% relative to the unsaturated polyester (solid content). Then, the product was cooled down to 120° C., and diluted with styrene until the non-volatile content became 60%. This product was designated as HP-1.

The unsaturated polyester had an acid value of 8.3, a hydroxyl value of 161 and a weight average molecular weight of 6,900.

(2) Unsaturated polyester No.2 (hereinafter referred to simply as "HP-2")

A reaction vessel similar to the one used for the synthesis of HP-1, was charged with 19.5 parts of isophthalic acid, 17.5 parts of phthalic anhydride, 15.7 parts of adipic acid, 4.0 parts of fumaric acid, 36.5 parts of neopentyl glycol and 6.8 parts of trimethylol propane. The mixture was heated to 240° C. under a nitrogen atmosphere, and reacted at the same temperature for 9.5 hours. Then, the product was cooled to 180° C., and hydroquinone was added in an amount of 0.1% by weight relative to the unsaturated polyester (solid content).

Then, the product was cooled down to 120° C., and diluted with styrene so that the non-volatile content became 60%. This product was designated as HP-2.

The unsaturated polyester had an acid value of 7.0, a hydroxyl value of 70 and a weight average molecular weight of 27,100.

(3) Unsaturated polyester No.3 (hereinafter referred to simply as "HP-3")

A reaction vessel similar to the one used for the synthesis of HP-1, was charged with 17.5 parts of methylhexahydro phthalic anhydride, 16.0 parts of isophthalic acid, 14.5 part of adipic acid, 4.0 parts of fumaric acid, 25.0 parts of neopenthyl glycol, 13.0 parts of hydrogenated bisphenol A and 10 parts of trimethylol ethane. The mixture was reacted under a nitrogen atmosphere at 240° C. for 3 hours. When the acid value became about 20, the pressure in the system was reduced, and the reaction was continued for further about 7 hours under reduced pressure.

Then, after returning the pressure to atmospheric pressure, the reaction product was cooled to 180° C., and catechol was added in an amount of 0.04% relative to the unsaturated polyester (solid content). Then, the product was cooled down to 120° C., and diluted with methyl methacrylate so that the non-volatile content became 60%. This product was designated as HP-3.

The unsaturated polyester had an acid value of 7.5, a hydroxyl value of 114 and a weight average molecular weight of 11,800.

(4) Unsaturated polyester No.4 (hereinafter referred to simply as "HP-4")

A reaction vessel similar to the one used for the synthesis of HP-1, was charged with 32.6 parts of phthalic anhydride, 18.7 parts of adipic acid, 3.0 parts of fumaric and, 29.5 parts of neopentyl glycol, 14 parts of trimethylol propane and 2.2 parts of pentaerythritol. The mixture was heated to 240° C. under a nitrogen gas atmosphere, and reacted at the same temperature for about 9 hours. The product was cooled to 180° C., and hydroquinone was added in an amount of 0.02% by weight relative to the unsaturated polyester (solid content). Further, the product was cooled down to 120° C. and diluted with styrene so that the non-volatile content became 60%. This product was designated as HP-4.

The unsaturated polyester had an acid value of 9.9, a hydroxyl value of 123 and a weight average molecular weight of 9,600.

PREPARATION OF VINYL ESTER RESINS (1) A reaction vessel equipped with a stirrer, a thermometer and a condenser was charged with 470 parts (1 equivalent) of Epikote #1001, 86 parts (1 equivalent) of methacrylic acid, 0.2 part of hydroquinone and 2.22 parts of triethylamine, and the reaction was conducted in an atmosphere of air at a temperature of from 145° to 155° C. for 1 hour and 10 minutes. The acid value became 2.5, and the cooling was initiated. When the temperature reached 130° C., 456 parts (45%) of styrene was added and the mixture was cooled to room temperature to complete the reaction.

The vinyl ester resin thus obtained had a color number (Gardner Method) of 3 and a viscosity of 5.3 poise/25° C. This resin was designated as VE-1.

(2) A reaction vessel similar to the one used for the synthesis of VE-1, was charged with 561 parts (3 equivalents) of AER #330, 216 parts (3 equivalents) of acrylic acid, 0.231 part of hydroquinone and 3.1 parts of 2,4,6-tris(dimethylaminomethyl)phenol, and the reaction was conducted in an atmosphere of air at a temperature of from 120° to 125° C. for 2 hours and 30 minutes. The acid value became 4.7, and the cooling was initiated. When the temperature reached 100° C., 336 parts (30%) of styrene was added, and the mixture was cooled to room temperature to complete the reaction.

The vinyl ester resin thus obtained, had a color number of 8 and a viscosity of 4.2 poise/25° C. This resin was designated as VE-2.

EXAMPLE 1

A reaction vessel equipped with a stirrer, a thermometer, a dropping funnel and a condenser was charged with 130 parts of mineral spirit and 300 parts of a dispersion stabilizer (A-1), and the temperature was raised to 90° C. Then, a mixture of the following monomers, unsaturated polyester and initiator, was added dropwise over a period of 3 hours:

| Butyl methacrylate | 35 parts |
| Isobutyl methacrylate | 33 parts |
| Ethyl acrylate | 5 parts |
| 2-Hydroxyethyl methacrylate | 7 parts |
| Unsaturated polyester (HP-1) | 50 parts |
| Benzoyl peroxide | 2.5 parts |
| Azobisisobutyronitrile | 0.5 part |

After the completion of the dropwise addition, 1.2 parts of benzoyl peroxide was added, and the reaction was conducted at the same reaction temperature for further 5 hours. The reaction product was a milky white dispersion having an acid value of 13.3, a hydroxyl value of 25 and a non-volatile content of 49.6%.

The non-aqueous dispersion type resin composition thus obtained, was designated as HD-1.

EXAMPLE 2

A reaction vessel similar to the one used for the synthesis of HD-1, was charged with 108 parts of mineral spirit and 161 parts of a dispersion stabilizer (A-2), and the temperature was raised to 90° C. Then, a mixture of the following monomers, unsaturated polyester and initiator, was added dropwise over a period of 3 hours:

| Unsaturated polyester (HP-2) | 15 parts |
| Butyl methacrylate | 60 parts |
| t-Butyl methacrylate | 8 parts |
| Methyl methcarylate | 7 parts |
| Styrene | 5 parts |
| Butyl acrylate | 3 parts |
| 2-Hydroxypropyl methacrylate | 9 parts |
| Acrylic acid | 2 parts |
| Benzoyl peroxide | 3 parts |

After the completion of the dropwise addition, 1.2 parts of benzoyl peroxide was added, and the reaction was conducted at the same temperature for further 5 hours.

The reaction product was a milky white dispersion having an acid value of 9.8, and hydroxyl value of 22 and a non-volatile content of 49.8%. The non-aqueous dispersion type resin composition thus obtained, was designated as HD-2.

EXAMPLE 3

A reaction vessel similar to the one used for the synthesis of HD-1, was charged with 116 parts of mineral spirit and 199 parts of a dispersion stabilizer (A-3), and the temperature was raised to 90° C. Then, a mixture of the following monomers, unsaturated polyester and initiator, was added dropwise over a period of 3 hours:

| | | |
|---|---|---|
| Butyl methacrylate | 42 | parts |
| Isobutyl methacrylate | 28 | parts |
| Styrene | 10 | parts |
| Unsaturated polyester (HP-3) | 25 | parts |
| 2-Hydroxyethyl methacrylate | 10 | parts |
| Benzoyl peroxide | 2.5 | parts |
| Azobisisobutyronitrile | 0.5 | part |

After the completion of the dropwise addtion, 1.2 parts of benzoyl peroxide was added, and the reaction was conducted at the same temperature for further 5 hours. The reaction product was a milky white dispersion having an acid value of 6.0, a hydroxyl value of 27 and a non-volatile content of 49.8%. The non-aqueous dispersion type resin composition thus obtained, was designated as HD-3.

EXAMPLE 4

The reaction was conducted in the same manner as in the preparation of HD-3 except that the dispersion stabilizer (A-3) was used in an amount of 398 parts and the mineral spirit was used in an amount of 117 parts. The reaction product was a milky white dispersion having an acid value of 7.1, a hydroxyl value of 18 and a non-volatile content of 50.1%. The non-aqueous dispersion type resin composition thus obtained, was designated as HD-4.

EXAMPLE 5

A reaction vessel similar to the one used for the synthesis of HD-1, was charged with 117 parts of mineral spirit and 301 parts of a dispersion stabilizer (A-4), and the temperature was raised to 90° C. Then, a mixture of the following monomers, unsaturated polyester and initiator, was added dropwise over a period of 3 hours:

| | | |
|---|---|---|
| Methyl methacrylate | 11 | parts |
| Isobutyl methacrylate | 63 | parts |
| Unsaturated polyester (HP-4) | 30 | parts |
| 2-Hydroxyethyl methacrylate | 13 | parts |

| | | |
|---|---|---|
| Acrylic acid | 1 | part |
| Benzoyl peroxide | 3 | parts |

After the completion of the dropwise addition, 1.2 parts of benzoyl peroxide was added, and the reaction was conducted at the same temperature for further 5 hours. The reaction product was a milky white dispersion having an acid value of 11.9, a hydroxyl value of 27 and a non-volatile content of 49.9%. The non-aqueous dispersion type resin composition thus obtained, was designated as HD-5.

COMPARATIVE EXAMPLE 1

The reaction was conducted in the same manner as in Example 3 except that the unsaturated polyester (HP-3) was omitted, the dispersion stabilizer (A-3) was replaced by (A-9), and 10 parts of methyl methacrylate was added as a monomer component. The reaction product was a milky white dispersion having an acid value of 5.3, a hydroxyl value of 22 and a non-volatile content of 50%. The non-aqueous dispersion type resin composition thus obtained, was designated as HD-6.

COMPARATIVE EXAMPLE 2

In Example 1, 130 parts of mineral spirit was changed to 150 parts, and 300 parts of the dispersion stabilizer (A-1) was replaced by 250 parts of a soybean oil-modified alkyd resin solution having an acid value of 11, a hydroxyl value of 101, an oil length of 30% and a non-volatile content of 60%. Then, a mixture of the following monomers and initiator was added dropwise, and the reaction was conducted in a similar manner:

| | | |
|---|---|---|
| Butyl methacrylate | 35 | parts |
| Isobutyl methacrylate | 33 | parts |
| Ethyl acrylate | 5 | parts |
| 2-Hydroxyethyl methacrylate | 7 | parts |
| Styrene | 20 | parts |
| Benzoyl peroxide | 1 | part |

The reaction product was a milky white dispersion having an acid value of 7.1, a hydroxyl value of 73 and a non-volatile content of 49.5%. The non-aqueous dispersion type resin composition thus obtained, was designated as HD-7.

The non-aqueous dispersion type resin compositions of the present invention (HD-1 to HD-5) and Comparative Examples (HD-6 to HD-7) thus obtained, were spray-coated on polished soft steel plates (0.8×70×150 mm) to have a film thickness of from 30 to 35 μm, left to stand still at room temperature for 20 minutes and then heated and dried at 160° C. for 20 minutes.

The test pieces were subjected to Comparative Tests for their coating film properties. The results thereby obtained are shown in Table 1.

TABLE 1

| | Comparative Test Results | | | | | | |
|---|---|---|---|---|---|---|---|
| | Examples | | | | | Comparative Examples* | |
| | 1 | 2 | 3 | 4 | 5 | 1 | 2 |
| Non-aqueous dispersion type resin composition (Note 1) Transparency | HD-1 ◯ | HD-2 ◯ | HD-3 ◯ | HD-4 ◯ | HD-5 ◯ | HD-6 X | HD-7 X |

TABLE 1-continued

| | Comparative Test Results | | | | | | |
|---|---|---|---|---|---|---|---|
| | Examples | | | | | Comparative Examples* | |
| | 1 | 2 | 3 | 4 | 5 | 1 | 2 |
| of the films (Note 2) | ○ | ○ | ○ | ○ | ○ | ○ | X |
| Yellowing of the films (Note 3) | H-2H | 2H | 2H | 2H | 2H | 2H | HB |
| Pencil hardness (Note 4) | 100/100 | 100/100 | 100/100 | 100/100 | 100/100 | 100/100 | 100/100 |
| Adhesion (Note 5) | 7< | 7< | 7< | 7< | 7< | 5.0 | 6.4 |
| Erichsen Test (Note 6) | >50 | >50 | >50 | >50 | >50 | 30 | 20 |
| Impact resistance (Note 7) | ⊙ | ⊙ | ⊙ | ⊙ | ⊙ | Δ | Δ |
| Secondary adhesion (I) (Note 8) | ⊙ | ⊙ | ⊙ | ⊙ | ⊙ | Δ | Δ |
| Secondary adhesion (II) (Note 9) | ⊙ | ⊙ | ⊙ | ⊙ | ⊙ | ⊙ | Δ |
| Secondary adhesion (III) (Note 10) | 91 | 89 | 92 | 92 | 87 | 70 | 57 |
| Accelerated weather resistance (Note 11) | >10 | >10 | >10 | >10 | >10 | 6 | 6 |
| Storage stability | | | | | | | |

*The non-aqueous dispersion type resin composition and the melamine resin were mixed in a solid content weight ratio of 80/20, and the mixture was heated and dried.
(Note 1): Visual evaluation ○ : transparent X: opaque
(Note 2): Visual evaluation ○ : No yellowing X: Yellowing
(Note 3): A Mitsubishi pencil "UNI" was placed on the coating film at an angle of 45°, and gently pushed forward, whereupon the pencil hardness where no trace of the pencil mark remained on the film was determined.
(Note 4): Cross-cut peeling test with an adhesive tape
(Note 5): By Erichsen testing machine
(Note 6): In accordance with the method of JIS K-5400, 6, 13, 3B
(Note 7): Cross-cut peeling test with an adhesive tape after the moisture resistance test (50° C., 97% RH<) for 120 hours.
⊙ 100/100–95/100
○ 94/100–85/100
Δ 84/100–60/100
X 59/100–0/100
(Note 8): Salt spray resistance: A test piece with cross-cut lines reaching the substrate, was subjected to a salt spray test (JIS Z-2371) for 100 hours, and then the cross-cut portions were peeled with an adhesive tape.
⊙ Peeled width at one side: 0–0.1 mm
○ Peeled width at one side: 1.1–2.0 mm
Δ Peeled width at one side: 2.1–3.0 mm
X Peeled width at one side: At least 3.1 mm
(Note 9): Water resistance: The test pieces were immersed in city water at 20° C. for 5 days, and then subjected to a cross-cut peeling test with an adhesive tape.
⊙ 100/100–95/100
○ 94/100–85/100
Δ 84/100–60/100
X 59/100–0/100
(Note 10): Gloss retention after being subjected to ATLAS UVCON (manufactured by Toyo Seiki Seisakusho Co., Ltd.) for 1,000 hours.
Test temperature: In the light cycle: 70° C.
In the wet cycle: 50° C.
For the accelerated weather resistance test, a steel plate chemically treated with zinc phosphate and coated with an electrodeposited urethane resin-type cation primer (electrodeposited film thickness: 18 μm; coating voltage: 250 V; electric conduction time: 2 min.; drying under heating at 180° C. for 20 min.), a polyester melamine resin type intermediate coat (film thickness: 36 μm; drying under heating at 150° C. for 20 min.) and an acryl melamine resin type gray metallic top coat (film thickness: 15 μm), was used as a substrate. After expiry of 3 minutes from the application of the top coat, each of the above-mentioned non-aqueous dispersion type resin compositions was applied to the substrate by an air-spray to form a film having a thickness of 30 μm, and baked at 160° C. for 20 minutes to obtain a test piece.
(Note 11): Each non-aqueous dispersion type resin composition (provided that in the Comparative Examples, a melamine resin was incorporated) was maintained in a constant temperature room at 50° C., whereby a number of days until a change such as precipitation of particles, phase separation or substantial increase of the viscosity appeared, was counted.

EXAMPLE 6

The non-aqueous dispersion type resin composition HD-1 obtained in Example 1 was used as it was.

EXAMPLE 7

A reaction vessel similar to the one used for the synthesis of HD-1, was charged with 100 parts of mineral spirit and 302 parts of a dispersion stabilizer (A-7), and the temperature was raised to 85° C. Then, a mixture of the following monomers, unsaturated polyester and initiator, was added dropwise over a period of 3 hours:

| Unsaturated polyester (HP-2) | 12 parts |
| --- | --- |
| Methyl methacrylate | 37 parts |
| Styrene | 25 parts |
| Butyl acrylate | 15 parts |
| 2-Hydroxyethyl methacrylate | 10 parts |
| Methacrylic acid | 1 part |
| Benzoyl peroxide | 3 parts |

After the completion of the dropwise addition, 1.2 parts of benzoyl peroxide was added, and the reaction was conducted at the same temperature for further 5 hours.

The reaction product was a milky white dispersion having an acid value of 11.1, a hydroxyl value of 20 and a non-volatile content of 50.1%.

The non-aqueous dispersion type resin composition thus obtained was designated as HD-8.

COMPARATIVE EXAMPLE 3

The non-aqueous dispersion type resin composition HD-6 obtained in Comparative Example 1 was used as it was.

COMPARATIVE EXAMPLE 4

The non-aqueous dispersion type resin composition HD-7 obtained in Comparative Example 2 was used as it was.

The non-aqueous dispersion type resin compositions of Examples 6 and 7 and Comparative Examples 3 and 4 were applied onto polished soft steel plates, respectively, by an air spray to have a film thickness of from 30 to 35 μm, dried at room temperature for 7 days, and then subjected to comparative tests. The results thereby obtained are shown in Table 2.

TABLE 2

Comparative Test Results

| | Examples | | Comparative Examples | |
| --- | --- | --- | --- | --- |
| | 6 | 7 | 3 | 4 |
| Non-aqueous dispersion type resin composition | HD-1 | HD-8 | HD-6 | HD-7 |
| Transparency of the films | O | O | X | X |
| Yellowing of the films | O | O | O | O |
| Pencil hardness | B-HB | HB | B | 4B |
| Adhesion | 100/100 | 100/100 | 82/100 | 90/100 |
| Erichsen test | 5.2 | 4.8 | 3.0 | 2.2 |
| Impact resistance | 30 | 35 | 15 | 5 |
| Secondary adhesion (I) | ⊙ | ⊙ | Δ | X |
| Secondary adhesion (II) | O | ⊙ | Δ | Δ |
| Secondary adhesion (III) | | ⊙ | Δ | X |
| Storage stability* | >10 | >10 | 7 | 7 |

*The storage stability is represented by a number of days until a change such as precipitation of particles, phase separation or substantial increase of the viscosity appeared when each non-aqueous dispersion type resin composition was maintained in a constant temperature room at 50° C.

The tests and evaluation on other test items are carried out in the same manner as described with respect to Table 1.

From the comparative test results of Tables 1 and 2, it is apparent that the coating films obtained by the non-aqueous dispersion type resin compositions of the present invention, have superior transparency and no yellowing and they are sperior in the hardness, flexibility, impact resistance, weather resistance and secondary adhesion properties after the moisture test, the water resistance test or the salt spray test. Further, the compositions of the present invention have excellent storage stability.

EXAMPLE 8

A reaction vessel equipped with a stirrer, a thermometer, a dropping funnel and a condenser, was charged with 100 parts of mineral spirit and 240 parts of a dispersion stabilizer (A-1), and the temperature was raised to 90° C. Then, a mixture of the following monomers and initiator, was added dropwise over a period of 3 hours:

| Butyl methacrylate | 35 parts |
| --- | --- |
| Styrene | 20 parts |
| Ethyl acrylate | 5 parts |
| 2-Hydroxyethyl methacrylate | 16 parts |
| Isobutyl methacrylate | 24 parts |
| Benzoyl peroxide | 2 parts |
| Dodecylmercaptan | 0.1 part |
| Azobisisobutyronitrile | 1 part |

After the completion of the dropwise addition, 1.2 parts of benzoyl peroxide was added, and the reaction was conducted at the same temperature for further 5 hours.

The reaction product was a milky white dispersion having an acid value of 12.3, a hydroxyl value of 33 and a non-volatile content of 49.5%. This dispersion was designated as AD-1.

EXAMPLE 9

A reaction vessel similar to the one used for the synthesis of AD-1, was charged with 99 parts of mineral spirit and 100 parts of a dispersion stabilizer (A-2), and the temperature was raised to 90° C. Then, a mixture of the following monomers and initiator, was added dropwise over a period of 3 hours:

| Butyl methacrylate | 60 parts |
| --- | --- |
| t-Butyl methacrylate | 8 parts |
| Methyl methacrylate | 7 parts |
| Styrene | 11 parts |
| Butyl acrylate | 3 parts |
| 2-Hydroxypropyl methacrylate | 9 parts |
| Acrylic acid | 2 parts |
| Benzoyl peroxide | 3 parts |

After the completion of the dropwise addition, 1.2 parts of benzoyl peroxide was added and the reaction was conducted at the same temperature for further 5 hours.

The reaction product was a milky white dispersion having an acid value of 9.4, a hydroxyl value of 18 and non-volatile content of 50.1%. This dispersion was designated as AD-2.

EXAMPLE 10

A reaction vessel similar to the one used for the synthesis of AD-1, was charged with 101 parts of mineral spirit and 159 parts of a dispersion stabilizer (A-3), and the temperature was raised to 90° C. Then, a mixture of the following monomers and initiator, was added dropwise over a period of 3 hours:

| | |
|---|---|
| Methy methacrylate | 10 parts |
| Isobutyl methacrylate | 28 parts |
| Styrene | 10 parts |
| Butyl acrylate | 8 parts |
| 2-Hydroxyethyl methacrylate | 10 parts |
| Butyl methacrylate | 34 parts |
| Benzoyl peroxide | 2.5 parts |
| Azobisisobutyronitrile | 0.5 part |

After the completion of the dropwise addition, 1.2 parts of benzoyl peroxide was added, and the reaction was conducted at the same temperature for further 5 hours.

The reaction product was a milky white dispersion having an acid value of 5.0, a hydroxyl value of 25 and a non-volatile content of 50.3%. This dispersion was designated as AD-3.

EXAMPLE 11

The reaction was conducted in the same manner as in the preparation of AD-3, except that the amounts of the dispersion stabilizer (A-3) and the mineral spirit were changed to 398 parts and 102 parts, respectively.

The reaction product was a milky white dispersion having an acid value of 7.0, a hydroxyl value of 15 and a non-volatile content of 50.1%. This dispersion was designated as AD-4.

EXAMPLE 12

A reaction vessel similar to the one used for the synthesis of AD-1, was charged with 99 parts of mineral spirit and 301 parts of a dispersion stabilizer (A-4), and the temperature was raised to 90° C. Then, a mixture of the following monomers and initiator, was dropwise added over a period of 3 hours:

| | |
|---|---|
| Methyl methacrylate | 38 parts |
| Styrene | 15 parts |
| Isobutyl methacrylate | 18 parts |
| Ethyl acrylate | 15 parts |
| 2-Hydroxyethyl methacrylate | 13 parts |
| Acrylic acid | 1 part |
| Benzoyl peroxide | 3 parts |

After the completion of dropwise addition, 1.2 parts of benzoyl peroxide was added, and the reaction was conducted at the same temperature for further 5 hours. The reaction product was a milky white dispersion having an acid value of 11.8, a hydroxyl value of 23 and a non-volatile content of 49.7%. This dispersion was designated as AD-5.

COMPARATIVE EXAMPLE 5

The reaction was conducted in the same manner as in Example 10 except that the dispersion stabilizer (A-3) was replaced by (A-9).

The reaction product was a milky white dispersion having an acid value of 4.9, a hydroxyl value of 25 and a non-volatile content of 50.0%. This dispersion was designated as AD-6.

COMPARATIVE EXAMPLE 6

The reaction was conducted in the same manner as in Example 9 except that 99 parts of the mineral spirit was changed to 133 parts, 201 parts of the dispersion stabilizer (A-2) was replaced by 167 parts of a soybean oil-modified alkyd resin solution having an acid value of 11, a hydroxyl value of 101, an oil length of 30% and a non-volatile content of 60%, and 3 parts of benzoyl peroxide was changed to 1 part.

The reaction product was a milky white dispersion having an acid value of 13.9, a hydroxyl value of 68 and a non-volatile content of 49.7%. This dispersion was designated as AD-7.

The non-aqueous dispersion type resin compositions of the present invention (AD-1 to 5) and Comparative Examples (AD-6 to 7) thus obtained were applied onto polished soft steel plates (0.8×70×150 mm) by an air spray to have a film thickness of from 30 to 35 μm, left to stand at room temperature for 20 minutes, and then dried under heating at 160° C. for 20 minutes. The test pieces thereby obtained were subjected to comparative tests for the coating film properites. The results thereby obtained are shown in Table 3.

TABLE 3

| | Comparative Test Results | | | | | | |
|---|---|---|---|---|---|---|---|
| | Examples | | | | | Comparative Examples* | |
| | 8 | 9 | 10 | 11 | 12 | 5 | 6 |
| Non-aqueous dispersion type resin composition | AD-1 | AD-2 | AD-3 | AD-4 | AD-5 | AD-6 | AD-7 |
| (Note 1) Transparency of the films | ○ | ○ | ○ | ○ | ○ | X | X |
| (Note 2) Yellowing of the films | ○ | ○ | ○ | ○ | ○ | ○ | X |
| (Note 3) Pencil hardness | H | 2H | 2H | 2H | 2H | 2H | HB-F |
| (Note 4) Adhesion | 100/100 | 100/100 | 100/100 | 100/100 | 100/100 | 100/100 | 100/100 |
| (Note 5) Erichsen Test | 6< | 6< | 6< | 6< | 6< | 4.9 | 6 |

TABLE 3-continued

| | Comparative Test Results | | | | | |
|---|---|---|---|---|---|---|
| | Examples | | | | | Comparative Examples* |
| | 8 | 9 | 10 | 11 | 12 | 5 | 6 |
| (Note 6) Impact resistance | 30 | 40 | 30 | 35 | 40 | 30 | 20 |
| (Note 7) Stain resistance (I) | ○ | ○ | ○ | ○ | ○ | Δ | X |
| (Note 8) Accelerated weather resistance | 89 | 93 | 89 | 90 | 87 | 68 | 53 |
| (Note 9) Storage stability | >10 | >10 | >10 | >10 | >10 | 6 | 6 |

*The non-aqueous dispersion type resin composition and the melamine resin were mixed in a solid content weight ratio of 80/20, and the mixture was heated and dried.
(Note 1) to (Note 6) are the same as described with respect to Table 1.
(Note 7): With use of red, blue and black markers (Magic Ink, trade name, manufactured by Teranishi Chemical Co., Ltd.), the coated surface of each test piece was stained with red, blue and black inks, left to stand at room temperature for 24 hours and then wiped with methanol, whereupon the degree of the remaining stain was evaluated.
○ Almost no stain
Δ Slightly stained
X Extremely stained
(Note 8): The test and the evaluation were conducted in the same manner as described in (Note 10) of Table 1.
(Note 9): The test and the evaluation were conducted in the same manner as described in (Note 11) of Table 1.

EXAMPLE 13

The non-aqueous dispersion type resin composition (AD-3) obtained in Example 10, was used as it was.

EXAMPLE 14

A reaction vessel similar to the one used for the synthesis of AD-1, was charged with 100 parts of mineral spirit and 302 parts of a dispersion stabilizer (A-7), the temperature was raised to 85° C. Then, a mixture of the following monomers and initiator, was added dropwise over a period of 3 hours:

| | | |
|---|---|---|
| Methyl methacrylate | 44 | parts |
| Styrene | 30 | parts |
| Butyl acrylate | 10 | parts |
| 2-Hydroxyethyl methacrylate | 15 | parts |
| Methacrylic acid | 1 | part |
| Benzoyl peroxide | 2.5 | parts |

After the completion of the dropwise addition, 1.2 parts of benzoyl peroxide was added, and the reaction was conducted at the same temperature for further 5 hours.

The reaction product was a milky white dispersion having an acid value of 12.3, a hydroxyl value of 26 and a non-volatile content of 49.9%. This dispersion was designated as AD-8.

COMPARATIVE EXAMPLE 7

The non-aqueous dispersion type resin composition AD-6 obtained in Comparative Example 5, was used as it was.

COMPARATIVE EXAMPLE 8

The non-aqueous dispersion type resin composition AD-7 obtained in Comparative Example 6, was used as it was.

The non-aqueous dispersion type resin compositions of Examples 13 and 14 of the present invention and Comparative Examples 7 and 8 thus obtained, were applied onto polished steel plates, respectively, by an air spray to have a film thickness of from 30 to 35 μm, dried at room temperature for 7 days, and then subjected to comparative tests. The results thereby obtained are shown in Table 4.

TABLE 4

| | Comparative Test Results | | | |
|---|---|---|---|---|
| | Examples | | Comparative Examples | |
| | 13 | 14 | 7 | 8 |
| Non-aqueous dispersion type resin composition | AD-3 | AD-8 | AD-6 | AD-7 |
| Transparency of the films (Note 1) | ○ | ○ | X | X |
| Yellowing of the films (Note 2) | ○ | ○ | ○ | ○ |
| Pencil hardness (Note 3) | HB | HB | B | 4B |
| Adhesion (Note 4) | 100/100 | 100/100 | 87/100 | 92/100 |
| Erichsen test (Note 5) | 5.1 | 5.0 | 3.3 | 2.5 |
| Impact resistance (Note 6) | 30 | 30 | 15 | 5 |
| Stain resistance (Note 7) | ○ | ○ | Δ | X |
| Storage stability* (Note 8) | >10 | >10 | 7 | 7 |

(Note 1) to (Note 7) are the same as described with respect to Table 1.
(Note 8) was the same as described with respect to Table 2.

From the results of the comparative tests as shown in Tables 3 and 4, it is evident that the coating films obtained by the non-aqueous dispersion type resin compositions of the present invention, have superior transparency and no yellowing, and they are superior in the hardness, stain resistance and weather resistance. Further, the compositions of the present invention have excellent storage stability.

EXAMPLE 15

A reaction vessel equipped with a stirrer, a thermometer, a dropping funnel and a condenser, was charged with 100 parts of mineral spirit and 300 parts of a dispersion stabilizer (A-5), and the temperature was raised to 95° C. Then, a mixture of the following monomers, vinyl ester resin and initiator, was added dropwise over a period of 3 hours.:

| | |
|---|---|
| Methyl methacrylate | 38 parts |
| Styrene | 26.8 parts |
| Ethyl acrylate | 7 parts |
| 2-Hydroxyethyl methacrylate | 10 parts |
| Vinyl ester resin (VE-1) | 18.2 parts |
| Benzoyl peroxide | 3.5 parts |

After the completion of the dropwise addition, 1.2 parts of benzoyl peroxide was added, and the reaction was conducted at the same temperature for further 5 hours.

The reaction product was a milky white dispersion having an acid value of 11.3, a hydroxyl value of 22 and a non-volatile content of 50.1%. The non-aqueous dispersion type resin composition thus obtained was designated as VD-1.

EXAMPLE 16

A reaction vessel similar to the one used for the synthesis of VD-1, was charged with 99 parts of mineral spirit and 201 parts of a dispersion stabilizer (A-2), and the temperature was raised to 95° C. Then, a mixture of the following monomers, vinyl ester resin and intiator, was added dropwise over a period of 3 hours:

| | |
|---|---|
| Vinyl ester resin (VE-2) methacrylate | 18.6 parts |
|  | 12 parts |
| Methyl methacrylate | 33 parts |
| Styrene | 14.4 parts |
| Butyl acrylate | 8 parts |
| 2-Hydroxypropyl methacrylate | 13 parts |
| Methacrylic acid | 1 part |
| Benzoyl peroxide | 2 parts |
| Azobisisobutyronitrile | 1.5 parts |

After the completion of the dropwise addition, 1.2 parts of benzoyl peroxide was added, and the reaction was conducted at the same temperature for further 5 hours.

The reaction product was a milky white dispersion having an acid value of 4.5, a hydroxyl value of 33 and a non-volatile content of 50.3%. The non-aqueous dispersion type resin composition thus obtained was designated as VD-2.

EXAMPLE 17

A reaction vessel similar to the one used for the synthesis of VD-1, was charged with 100 parts of mineral spirit and 260 parts of a dispersion stabilizer (A-6), and the temperature was raised to 95° C. Then, a mixture of the following monomers, vinyl ester resin and initiator, was added dropwise over a period of 3 hours:

| | |
|---|---|
| Butyl methacrylate | 15 parts |
| Methyl methacrylate | 21 parts |
| Styrene | 18 parts |
| Vinyl ester resin (above-mentioned Ripoxy R-806) | 13 parts |
| 2-Hydroxyethyl methacrylate | 9 parts |
| Butyl acrylate | 19 parts |
| Ethyl acrylate | 4 parts |
| Methacrylic acid | 1 part |
| Benzoyl peroxide | 2.5 parts |
| Azobisisobutyronitrile | 1.0 part |

After the completion of the dropwise addition, 1.2 parts of benzoyl peroxide was added, and the reaction was conducted at the same temperature for further 5 hours.

The reaction product was a milky white dispersion having an acid value of 7.7, a hydroxyl value of 20 and non-volatile content of 49.9%. The non-aqueous dispersion type resin composition thus obtained, was designated as VD-3.

EXAMPLE 18

The reaction was conducted in the same manner as in the preparation of VD-3, except that the amount of the dispersion stabilizer (A-6) was changed to 400 parts.

The reaction product was a milky white dispersion having an acid value of 7.6, a hydroxyl value of 16 and a non-volatile content of 49.7%. The non-aqueous dispersion type resin composition thus obtained, was designated as VD-4.

EXAMPLE 19

A reaction vessel similar to the one used for the synthesis of VD-1, was charged with 99 parts of mineral spirit and 341 parts of a dispersion stabilizer (A-4), and the temperature was raised to 95° C. Then, a mixture of the following monomers, vinyl ester resin and intiator, was added dropwise over a period of 3 hours:

| | |
|---|---|
| Methyl methacrylate | 29 parts |
| Isobutyl methacrylate | 10.2 parts |
| Vinyl ester resin (above-mentioned Ripoxy H-600) | 7.3 parts |
| 2-Hydroxyethyl methacrylate | 10 parts |
| Methacrylic acid | 1.5 parts |
| Butyl methacrylate | 18 parts |
| Styrene | 14 parts |
| Butyl acrylate | 10 parts |
| Benzoyl peroxide | 3.5 parts |

After the completion of the dropwise addition, 1.2 parts of the benzoyl peroxide was added and the reaction was conducted at the same temperature for further 5 hours.

The reaction product was a milky white dispersion having an acid value of 13.5, and a hydroxyl value of 20 and a non-volatile content of 50.0%. The non-aqueous dispersion type resin composition thus obtained, was designated as VD-5.

COMPARATIVE EXAMPLE 9

The reaction was conducted in the same manner as in Example 17, except that the vinyl ester resin (above-mentioned Ripoxy R-806) was omitted, the dispersion stabilizer (A-6) was replaced by (A-10) and 7 parts of methyl methacrylate and 6 parts of styrene were added as monomer components.

The reaction product was a milky white dispersion having an acid value of 7.4, a hydroxyl value of 17 and a non-volatile content of 49.6%. The non-aqueous dispersion type resin composition thus obtained, was designated as VD-6.

COMPARATIVE EXAMPLE 10

In Example 15, 100 parts of the mineral spirit was changed to 150 parts, and 300 parts of the dispersion stabilizer (A-5) was replaced by 250 parts of a soybean oil-modified alkyd resin solution having an acid value of 11, a hydroxyl value of 101, an oil length of 30% and a non-volatile content of 60%. Then, a mixture of the following monomers and initiator, was added dropwise, and reacted in a similar manner:

persion type resin composition thus obtained, was designated as VD-7.

The non-aquoues dispersion type resin compositions of the present invention (VD-1 to 5) and Comparative Examples (VD-6 to 7) thus obtained, were applied onto polished soft steel plates (0.8×70×150 mm), respectively, by an air spray to have a film thickness of from 30 to 35 μm, left to stand at room temperature for 20 minutes, and then dried under heating at 160° C. for 20 minutes. The test pieces thus obtained were subjected to comparative tests for the coated film properties. The results thereby obtained are shown in Table 5.

TABLE 5
Comparative Test Results

|  | Examples |  |  |  |  | Comparative Examples |  |
|---|---|---|---|---|---|---|---|
|  | 15 | 16 | 17 | 18 | 19 | 9 | 10 |
| Non-aqueous dispersion type resin composition | VD-1 | VD-2 | VD-3 | VD-4 | VD-5 | VD-6 | VD-7 |
| Transparency of the films (Note 1) | ○ | ○ | ○ | ○ | ○ | X | X |
| Yellowing of the films (Note 2) | ○ | ○ | ○ | ○ | ○ | ○ | X |
| Pencil hardness (Note 3) | 2H | 2H | 2H | 2H | 2H | 2H | HB-F |
| Adhesion (Note 4) | 100/100 | 100/100 | 100/100 | 100/100 | 100/100 | 100/100 | 100/100 |
| Erichsen test (Note 5) | 7< | 7< | 7< | 7< | 7< | 5.1 | 6.2 |
| Impact resistance (Note 6) | >50 | >50 | >50 | >50 | >50 | 30 | 20 |
| Acid resistance (Note 7) | No change | No change | No change | No change | No change | Whitening | Whitening |
| Alkali resistance (Note 8) | No change | No change | No change | No change | No change | Whitening and blistering | Whitening and blistering |
| Secondary adhesion (I) (Note 9) | ⊙ | ⊙ | ⊙ | ⊙ | ⊙ | Δ | Δ |
| Secondary adhesion (II) (Note 10) | ⊙ | ⊙ | ⊙ | ⊙ | ⊙ | Δ | Δ |
| Secondary adhesion (III) (Note 11) | ⊙ | ⊙ | ⊙ | ⊙ | ⊙ |  | Δ |
| Storage stability (Note 12) | >10 | >10 | >10 | >10 | >10 | 8 | 6 |

*The non-aqueous dispersion type resin composition and the melamine resin were mixed in a solid content weight ratio of 80/20, and the mixture was heated and dried.
(Note 1) to (Note 6) were the same as (Note 1) to (Note 6) of Table 1.
(Note 7): Each test piece was immersed in a 5% sulfulic acid aqueous solution at a temperature of not higher than 20° C. for 48 hours, and then the outer appearance of the coating film and the formation of blisters were evaluated.
(Note 8): Each test piece was immersed in a 3% sodium hydroxide aqueous solution at a temperature of not higher than 20° C. for 48 hours, and then the outer apperance of the coating film and the formation of blisters were evaluated.
(Note 9): The test and evaluation were the same as (Note 7) of Table 1.
(Note 10): Salt spray resistance: a test piece cross-cut lines reaching the substrate, was tested by a salt spray test machine (JIS Z-2371) for 120 hours, and then the cross-cut portions were peeled with an adhesive tape.
⊙ Peeled width at one side: 0–0.1 mm
○ Peeled width at one side: 1.1–2.0 mm
Δ Peeled width at one side: 2.1–3.0 mm
X Peeled width at one side: At least 3.1 mm
(Note 11): Water resistance: The test pieces were immersed in city water at 20° C. for 10 days, and then subjected to a cross-cut peeling test with an adhesive tape.
⊙ 100/100–95/100
○ 94/100–85/100
Δ 84/100–60/100
X 59/100–0/100
(Note 12): The test and evaluation were the same as (Note 11) of Table 1.

| Methyl methacrylate | 38 parts |
| Ethyl acrylate | 7 parts |
| 2-Hydroxyethyl methacrylate | 10 parts |
| Styrene | 35 parts |
| Benzoyl peroxide | 1 part |

The reaction product was a milky white dispersion having an acid value of 7.7, a hydroxyl value of 79 and a non-volatile content of 49.7%. The non-aqueous dis-

EXAMPLE 20

The non-aqueous dispersion type resin composition VD-1 obtained in Example 15, was used as it was.

EXAMPLE 21

A reaction vessel similar to the one used for the synthesis of VD-1, was charged with 100 parts of mineral spirit and 302 parts of a dispersion stabilizer (VA-8), and the temperature was raised to 95° C. Then, a mixture of the following monomers, vinyl ester resin and initiator, was added dropwise over a period of 3 hours:

| Methyl methacrylate | 39 parts |
|---|---|
| Styrene | 25.6 parts |
| Vinyl ester resin (VE-2) | 12.9 parts |
| 2-Hydroxyethyl methacrylate | 8 parts |
| Butyl acrylate | 14 parts |
| Methacrylic acid | 0.5 part |
| Benzoyl peroxide | 2.5 parts |
| Azobisisobutyronitrile | 1.0 part |

After the completion of the dropwise addition, 1.2 parts of the benzoyl peroxide was added, and the reaction was conducted at the same temperature for further 5 hours.

The reaction product was a milky white dispersion having an acid value of 8.9, a hydroxyl value of 18 and a non-volatile content of 49.9%. The non-aqueous dispersion type resin composition thus obtained, was designated as VD-8.

COMPARATIVE EXAMPLE 11

The non-aqueous dispersion type resin composition VD-6 obtained in Comparative Example 9, was used as it was.

COMPARATIVE EXAMPLE 12

The non-aqueous dispersion type resin composition VD-7 obtained in Comparative Example 10, was used as it was.

The non-aqueous dispersion type resin compositions of Examples 20 and 21 of the present invention and Comparative Examples 11 and 12 thus obtained, were applied onto polished soft steel plates, respectively, by an air spray to have a film thickness of from 30 to 35 μm, dried at room temperature for 7 days, and then subjected to comparative tests. The results thereby obtained, are shown in Table 6.

TABLE 6

| | Comparative Test Results | | | |
|---|---|---|---|---|
| | Examples | | Comparative Examples | |
| | 20 | 21 | 11 | 12 |
| Non-aqueous dispersion type resin compositions | VD-1 | VD-8 | VD-6 | VD-7 |
| Transparency of the films (Note 1) | O | O | X | X |
| Yellowing of the films (Note 2) | O | O | O | O |
| Pencil hardness (Note 3) | HB | HB | B | 4B |
| Adhesion (Note 4) | 100/100 | 100/100 | 85/100 | 90/100 |
| Erichsen test (Note 5) | 5.0 | 5.2 | 2.9 | 2.5 |
| Impact resistance (Note 6) | 30 | 30 | 15 | 5 |
| Acid resistance (Note 7) | No change | No change | Whitening and blistering | Whitening and blistering |
| Alkali resistance (Note 8) | No change | No change | Whitening and blistering | Whitening and blistering |
| Secondary adhesion (I) (Note 9) | ◉ | ◉ | Δ | X |
| Secondary adhesion (II) (Note 10) | ◉ | ◉ | Δ | Δ |
| Secondary adhesion (III) (Note 11) | ◉ | ◉ | Δ | X |
| Storage stability (Note 12) | >10 | >10 | 7 | 7 |

(Note 1) to (Note 11) were the same as described with respect to Table 5, and (Note 12) was the same as described with respect to Table 2.

From the results of the comparative tests as shown in Tables 5 and 6, it is apparent that the coating films obtained by the non-aqueous dispersion type resin compositions of the present invention, have superior transparency and no yellowing, and they are superior in the hardness, flexibility, impact resistance, chemical resistance and secondary adhesion properties after the moisture resistance test, the water resistance test and the salt spray resistance test. Further, the compositions of the present invention have excellent storage stability.

We claim:

1. A non-aqueous dispersion type resin composition comprising (I) a non-polar or slightly polar aliphatic hydrocarbon solvent as a dispersion medium, and (II) particles stably dispersed in the dispersion medium, wherein each of said particles is composed of:
   (A) from 20 to 70% by weight of a disperse particle made of (a) a polyester-modified vinyl copolymer containing a hydroxyl group, (b) a vinyl copolymer containing a hydroxyl group or (c) a vinyl ester-modified vinyl copolymer containing a hydroxyl group, and
   (B) from 80 to 30% by weight of a vinyl resin dispersion stabilizer surrounding the disperse particle as a protective layer, which has a component compatible with the disperse particle or is chemically bonded thereto and which is solvated by the dispersion medium, said dispersion stabilizer being a copolymer of from 5–30% by weight of (i) an N-alkoxymethylated monomer of an α,β-monoethylenically unsaturated carboxylic acid amide, from 5–60% by weight of (v) an α,β-monoethylenically unsaturated monomer represented by the general formula:

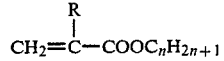

where R is H or CH$_3$, and n is an integer of 6–18, and from 10–90% by weight of (ii) an α,β-monoethylenically unsaturated monomer other than the monomer (i) and (v), and said dispersion medium is capable of dissolving the dispersion stabilizer and incapable of dissolving the disperse particles.

2. A non-aqueous dispserion type resin composition obtained by the graft-polymerization of (A) from 20 to 70% by weight of a mixture comprising (I) from 50 to 95% by weight of a monomer mixture of (iii) a hydroxyalkyl ester monomer of an α,β-monoethylenically unsaturated carboxylic acid with (iv) an α,β-monoethylenically unsaturated monomer other than the monomer (iii), and (II) from 5 to 50% by weight of a solvent-insoluble unsaturated polyester obtained from (a) an α,β-unsaturated dicarboxylic acid, (b) an acid component other than the acid (a), and (c) a polyhydric alcohol, in the presence of (B) from 80 to 30% by weight of a solvent-soluble vinyl resin dispersion stabilizer obtained by copolymerizing 5-30% by weight of (i) an N-alkoxymethylated monomer of an $\alpha,\beta$-monomethylenically unsaturated carboxylic amide with from 5 to 60% by weight of (v) an $\alpha,\beta$-monoethylenically unsaturated monomer represented by the general formula:

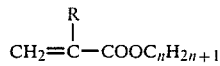

where R is H or $CH_3$ and n is an integer 6–18, and 10–90% by weight of (ii) an $\alpha,\beta$-monoethylenically unsaturated monomer other than the monomer (i) and (v), in an aliphatic hydrocarbon solvent which is capable of dissolving the monomers (i) to (v) and which is incapable of dissolving disperse particles of a polyester-modified vinyl copolymer containing a hydroxy group obtained from the solvent-insoluble unsaturated polyester and the monomers (iii) and (iv).

3. The non-aqueous dispersion type resin composition according to claim 2, wherein the $\alpha,\beta$-monoethylenically unsaturated monomer (v) represented by the general formula:

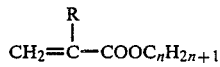

is at least one compound selected from the group consisting of 2-ethylhexyl (meth)acrylate, n-octyl (meth)acrylate, lauryl (meth)acrylate, dodecyl (meth)acrylate, and stearyl (meth)acrylate.

4. The non-aqueous dispersion type resin composition according to claim 2, wherein said monomer mixture comprises from 3 to 30% by weight of (iii) the hydroxyalkyl ester monomer of an $\alpha,\beta$-monoethylenically unsaturated carboxylic acid and from 70 to 97% by weight of (iv) the $\alpha,\beta$-monoethylenically unsaturated monomer other than the monomer (iii).

5. The non-aqueous dispersion type resin composition according to claim 2, wherein the unsaturated polyester is a condensation reaction product of from 1 to 10% by weight of (a) an $\alpha,\beta$-unsaturated dicaboxylic acid, from 29 to 69% by weight of (b) an acid component other than the acid (a), and from 30 to 70% by weight of (c) a polyhydric alcohol.

6. A non-aqueous dispersion type resin composition obtained by the copolymerization of (A) from 20 to 70% by weight of a monomer mixture of (iii) a hydroxyalkyl ester monomer of an $\alpha,\beta$-monoethylenically unsaturated carboxylic acid with (iv) an $\alpha,\beta$-monoethylenically unsaturated monomer other than the monomer (iii), in the presence of (B) from 80 to 30% by weight of a solvent-soluble vinyl resin stabilizer obtained by copolymerizing 5–30% by weight of (i) an N-alkoxymethylated monomer of an $\alpha,\beta$-monoethylenically unsaturated carboxylic acid amide, from 5 to 60% by weight of (v) an $\alpha,\beta$-monoethylenically unsaturated monomer represented by the general formula:

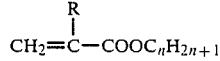

where R is H or $CH_3$ and n is an integer of 6 to 18, and with (ii) an $\alpha,\beta$-monoethylenically unsaturated monomer other than the monomer (i) and (v), in an aliphatic hydrocarbon solvent which is capable of dissolving the monomers (i) to (v) and which is incapable of dissolving disperse particles of a vinyl copolymer containing a hydroxyl group obtained from the monomers (iii) and (iv).

7. The non-aqueous dispersion type resin composition according to claim 6, wherein the $\alpha,\beta$-monoethylenically unsaturated monomer (v) represented by the general formula:

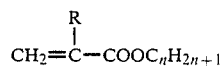

is at least one compound selected from the group consisting of 2-ethylhexyl (meth)acrylate, n-octyl (meth)acrylate, lauryl (meth)acrylate, dodecyl (meth)acrylate, and stearyl (meth)acrylate.

8. The non-aqueous dispersion type resin composition according to claim 6, wherein said monomer mixture comprises from 3 to 30% by weight of (iii) the hydroxyalkyl ester monomer of an $\alpha,\beta$-monoethylenically unsaturated carboxylic acid and from 70 to 97% by weight of (iv) the $\alpha,\beta$-monoethylenically unsaturated monomer other than the monomer (iii).

9. A non-aqueous dispersion type resin composition obtained by the polymerization of (A) from 20 to 70% by weight of a mixture comprising (I) from 75 to 97% by weight of a monomer mixture of (iii) a hydroxyalkyl ester monomer of an $\alpha,\beta$-monoethylenically unsaturated carboxylic acid with (iv) an $\alpha,\beta$-monoethylenically unsaturated monomer other than the monomer (iii), and (II) from 3 to 25% by weight of a vinyl ester obtained from (a) an epoxy compound having at least one epoxy group in its molecule and (b) an unsaturated monocarboxylic acid, in the presence of (B) from 80 to 30% by weight of a solvent-soluble vinyl resin dispersion stabilizer obtained by copolymerizing (i) an N-alkoxymethylated monomer of an $\alpha,\beta$-monoethylenically unsaturated carboxylic acid amide with (ii) an $\alpha,\beta$-monoethylenically unsaturated monomer other than the monomer (i), in an aliphatic hydrocarbon solvent which is capable of dissolving the monomers (i) to (iv) and which is incapable of dissolving disperse particles of a vinyl ester-modified vinyl copolymer containing a hydroxyl group obtained from the vinyl ester and the monomers (iii) and (iv).

10. The non-aqueous dispersion type resin composition according to claim 9, wherein the solvent-soluble vinyl resin dispersion stabilizer is a copolymer of from 5 to 30% by weight of (i) an N-alkoxymethylated monomer of an $\alpha,\beta$-monoethylenically unsaturated carboxylic acid amide, from 5 to 60% by weight of (v) an $\alpha,\beta$-monoethylenically unsaturated monomer represented by the general formula:

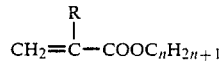

where R is H or $CH_3$ and n is an integer of 6 to 18, and from 10 to 90% by weight of (vi) an $\alpha,\beta$-monoethylenically unsaturated monomer other than the monomers (i) and (v).

11. The non-aqueous dispersion type resin composition according to claim 10, wherein the α, β-monoethylenically unsaturated monomer (v) represented by the general formula:

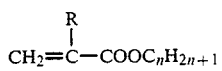

is at least one compound selected from the group consisting of 2-ethylhexyl (meth)acrylate, n-octyl (meth)acrylate, lauryl (meth)acrylate, dodecyl (meth)acrylate, and stearyl (meth)acrylate.

12. The non-aqueous dispersion type resin composition according to claim 9, wherein said monomer mixture comprises from 3 to 30% by weight of (iii) the hydroxyalkyl ester monomer of an α, β-monoethylenically unsaturated carboxylic acid and from 70 to 97% by weight of (iv) the α, β-monoethylenically unsaturated monomer other than the monomer (iii).

13. The non-aqueous dispersion type resin composition according to claim 9, wherein the vinyl ester is a reaction product obtained by esterifying (a) the epoxy compound containing at least one epoxy group in its molecule with (b) the unsaturated monocarboxylic acid in an amount of from 0.6 to 1.2 mols of the carboxyl group of the acid (b) relative to 1 mol of the epoxy group of the compound (a).

* * * * *